United States Patent
Yamashita et al.

(10) Patent No.: US 8,048,251 B2
(45) Date of Patent: Nov. 1, 2011

(54) METHOD OF MANUFACTURING OPTICAL FILM

(75) Inventors: Akio Yamashita, Kanagawa (JP); Yumiko Fukumoto, Kanagawa (JP); Yuugo Goto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 779 days.

(21) Appl. No.: 10/595,310

(22) PCT Filed: Oct. 25, 2004

(86) PCT No.: PCT/JP2004/016180
§ 371 (c)(1), (2), (4) Date: Apr. 6, 2006

(87) PCT Pub. No.: WO2005/041249
PCT Pub. Date: May 6, 2005

(65) Prior Publication Data
US 2007/0054436 A1     Mar. 8, 2007

(30) Foreign Application Priority Data
Oct. 28, 2003   (JP) .................. 2003-367326

(51) Int. Cl.
*B44C 1/17*   (2006.01)
*B29C 65/48*  (2006.01)
*B32B 37/12*  (2006.01)
*B32B 37/26*  (2006.01)
*B32B 38/10*  (2006.01)

(52) U.S. Cl. ........................ 156/235; 156/247

(58) Field of Classification Search .......... 156/230–235, 156/246, 247; 428/469, 472, 439
See application file for complete search history.

(56) References Cited

U.S. PATENT DOCUMENTS

| | | | | |
|---|---|---|---|---|
| 3,971,710 A * | 7/1976 | Romankiw | .................. | 428/620 |
| 4,800,100 A * | 1/1989 | Herbots et al. | ................ | 427/527 |
| 4,934,791 A * | 6/1990 | Shimizu et al. | ................ | 349/107 |
| 5,096,520 A * | 3/1992 | Faris | ............................... | 156/99 |
| 5,156,720 A * | 10/1992 | Rosenfeld et al. | .............. | 205/76 |

(Continued)

FOREIGN PATENT DOCUMENTS
EP    858110 A1    8/1998

(Continued)

OTHER PUBLICATIONS
English Abstract of JP 53-31971A.*

(Continued)

*Primary Examiner* — Philip Tucker
*Assistant Examiner* — Sing P Chan
(74) *Attorney, Agent, or Firm* — Fish & Richardson P.C.

(57) ABSTRACT

To provide a method of manufacturing an optical film formed on a plastic substrate. There is provided a method of manufacturing an optical film including the steps of laminating a separation layer and an optical filter on a first substrate, separating the optical filter from the first substrate, attaching the optical filter to a second substrate. Since the optical film manufactured according to the invention has flexibility, it can be provided on a portion or a display device having a curved surface. Further, the optical film is not processed at high temperatures, and hence, an optical film having high yield with high reliability can be formed. Furthermore, an optical film having an excellent impact resistance property can be formed.

18 Claims, 10 Drawing Sheets

U.S. PATENT DOCUMENTS

| | | | |
|---|---|---|---|
| 6,057,961 A * | 5/2000 | Allen et al. | 359/494 |
| 6,127,199 A | 10/2000 | Inoue et al. | |
| 6,174,578 B1 * | 1/2001 | Holley | 428/40.1 |
| 6,372,608 B1 | 4/2002 | Shimoda et al. | |
| 6,445,005 B1 | 9/2002 | Yamazaki et al. | |
| 6,645,830 B2 | 11/2003 | Shimoda et al. | |
| RE38,466 E | 3/2004 | Inoue et al. | |
| 6,781,152 B2 | 8/2004 | Yamazaki et al. | |
| 6,808,773 B2 | 10/2004 | Shimamura et al. | |
| 6,818,530 B2 | 11/2004 | Shimoda et al. | |
| 6,867,067 B2 * | 3/2005 | Ghyselen et al. | 438/107 |
| 6,888,305 B2 | 5/2005 | Weaver | |
| 6,894,312 B2 | 5/2005 | Yamazaki et al. | |
| 7,094,665 B2 | 8/2006 | Shimoda et al. | |
| 7,189,631 B2 | 3/2007 | Yamazaki et al. | |
| 7,285,476 B2 | 10/2007 | Shimoda et al. | |
| RE40,601 E | 12/2008 | Inoue et al. | |
| 7,468,308 B2 | 12/2008 | Shimoda et al. | |
| 2002/0121860 A1 | 9/2002 | Seo et al. | |
| 2002/0190257 A1 | 12/2002 | Yamazaki et al. | |
| 2003/0007341 A1 | 1/2003 | Shimamura et al. | |
| 2003/0032210 A1 | 2/2003 | Takayama et al. | |
| 2004/0129960 A1 | 7/2004 | Maruyama et al. | |
| 2004/0231873 A1 | 11/2004 | Shimamura et al. | |
| 2005/0162092 A1 | 7/2005 | Yamazaki et al. | |
| 2009/0239320 A1 | 9/2009 | Takayama et al. | |

FOREIGN PATENT DOCUMENTS

| | | |
|---|---|---|
| EP | 1 085 576 A2 | 3/2001 |
| EP | 1 220 339 A2 | 7/2002 |
| EP | 1351308 A1 | 10/2003 |
| EP | 1 389 901 A1 | 2/2004 |
| EP | 1 085 576 A3 | 4/2004 |
| EP | 1655633 A2 | 5/2006 |
| EP | 1744365 A2 | 1/2007 |
| EP | 1758169 A2 | 2/2007 |
| JP | 53031971 A * | 3/1978 |
| JP | 10150007 A | 6/1998 |
| JP | 11052119 A * | 2/1999 |
| JP | 11074533 A | 3/1999 |
| JP | 11-243209 A | 9/1999 |
| JP | 2001-217072 | 8/2001 |
| JP | 2002-184959 A | 6/2002 |
| JP | 2002-324680 | 11/2002 |
| JP | 2003-174153 A | 6/2003 |
| JP | 2003-258488 | 9/2003 |
| JP | 2003-298284 | 10/2003 |
| WO | WO 02/096178 A1 | 11/2002 |
| WO | WO03052842 A2 | 6/2003 |

OTHER PUBLICATIONS

English translation of JP 53-31971.*

English Abstract of JP 11-52119.*

Machine Translation of JP 11-52119.*

PCT International Search Report (Application No. PCT/JP2004/016180), 3 pages, dated Apr. 26, 2005.

PCT Written Opinion (Application No. PCT/JP2004/JP2004/016180), 3 pages, dated Apr. 26, 2005.

* cited by examiner

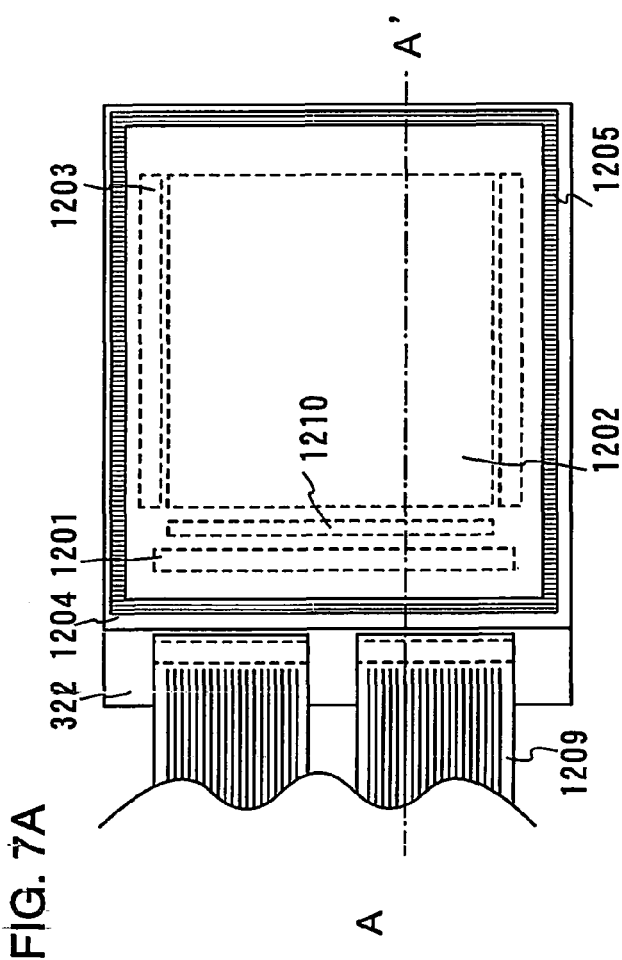
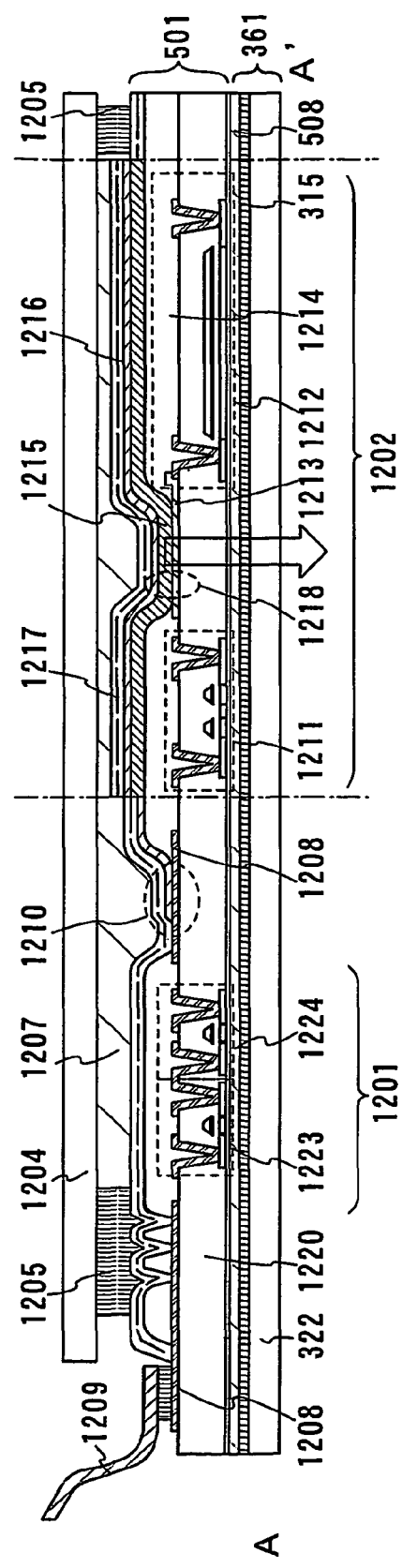
FIG. 7A
FIG. 7B

METHOD OF MANUFACTURING OPTICAL FILM

TECHNICAL FIELD

The present invention relates to a method of manufacturing an optical film formed over a plastic substrate.

BACKGROUND ART

In recent years, a technique of forming a thin film transistor (TFT) using a semiconductor thin film (with a thickness of approximately from several nm to several hundreds nm), which is formed over a substrate with an insulated surface, has been attracting attention. The thin film transistor has been widely applied in various electronic devices such as an IC and an electronic apparatus. In particular, development related to the thin film transistor as a switching element for a liquid crystal panel and a light emitting display panel has been hurried.

With respect to a liquid crystal display panel, a liquid crystal material is sandwiched between an element substrate and an opposing substrate. Here, TFTs using amorphous silicon or polysilicon as semiconductors are arranged in matrix, and pixel electrodes, source wirings and gate wirings connecting to each TFT are formed over the element substrate respectively. The opposing substrate having an opposing electrode is placed opposite to the element substrate. Further, a color filter for color display is formed over the element substrate or the opposing substrate. Polarizing plates are then arranged over the element substrate and the opposing substrate as optical shutters, respectively, to display color images.

The color filter of the liquid crystal display device has colored layers consisting of R (red), G (green), B (blue), and a light shielding mask (black matrix) covering gaps between pixels, and extracts red light, green light, and blue light by transmitting light therethrough. A light shielding mask for the color filter is generally made from a metal film or an organic film containing a black pigment. The color filter is arranged at a position corresponding to the pixels, thereby being capable of changing the colors of light to be extracted for each pixel. Note that, the position corresponding to the pixels indicates a position that accords with a pixel electrode.

With respect to a light emitting display device, there are a colorizing method by arranging light emitting elements that emit red light, green light, or blue light in matrix; a coloring method by utilizing a color filter with use of a light emitting element that emits white light; and the like. The colorizing method by utilizing the color filter with use of the light emitting element that emits white color is similar to a colorizing method for a liquid crystal display device using a color filter in principle (see patent document 1).

[Patent document 1]: Japanese Patent Application Laid-Open No. 2001-217072

DISCLOSURE OF INVENTION

Conventionally, a color filter used for a liquid crystal display device has been formed over a glass substrate. Therefore, there has been a problem in which the color filter formed over the glass substrate and the liquid crystal display device using the color filter have poor impact resistance properties and tend to be cracked easily as the thickness of the glass substrate is reduced. Consequently, it has been difficult to fabricate a thin liquid crystal display device.

Further, since the glass substrate does not have flexibility, it has been difficult to form a color film on a portion or a display device that has a curved surface.

Furthermore, a colored resin and a pigment dispersing resin have been generally used as a raw material for the color filter. In order to cure these resins, however, it is necessary to carry out a step of heating at constant temperatures. Therefore, it has been difficult to form the color filter over a thermoplastic substrate.

According to the above-mentioned problems, the present invention provides a method of manufacturing an optical film formed over a plastic substrate.

According Lo one aspect of the invention, there is provided a method of manufacturing an optical film, wherein after forming a separation layer and a subject body having an optical filter over a first substrate, a second substrate is attached to the subject body by using a first adhesive material so that the second substrate faces the first substrate, and the separation is caused between the separation layer and the subject body.

According to another aspect of the invention, there is provided a method of manufacturing an optical film, wherein after forming a separation layer and a subject body having an optical filter over a first substrate, a support medium is attached to the subject body by using a peelable adhesive agent so that the support medium faces the subject body, and the separation is caused between the separation layer and the subject body, and after forming a second substrate on the subject body by using a adhesive material, the support medium and the peelable adhesive agent is separated from the optical filter.

Note, the separation layer is formed of an element selected from titanium (Ti), aluminum (Al), tantalum (Ta), tungsten (W), molybdenum (Mo), copper (Cu), chromium (Cr), neodymium (Nd), iron (Fe), nickel (Ni), cobalt (Co), ruthenium (Ru), rhodium (Rh), palladium (Pd), osmium (Os), iridium (Ir); a single layer composed of an alloy material or a compound material containing the above-mentioned elements as its main constituent; a lamination layer of the single layers. Further, the subject body comprises silicon oxide, silicon oxynitride, or metal oxide.

According to another aspect of the invention, there is provided a method of manufacturing an optical film, wherein after forming a metal layer, an insulating layer, and an optical filter over a first substrate, a second substrate is attached to the optical filter, and the first substrate is separated from the optical filter.

According to another aspect of the invention, there is provided a method of manufacturing an optical film, wherein after forming a metal layer, an insulating layer, and an optical filter over a first substrate, the optical filter is separated from the first substrate, and a second substrate is attached to the optical filter.

In the present invention, a metal oxide layer may be formed between the metal layer and the insulating layer simultaneously with forming the metal layer and the insulating layer.

Further, the optical filter may be formed after heating the insulating layer to form a metal oxide layer between the metal layer and the insulating layer.

After forming the optical filter, a metal oxide layer may be formed between a separation layer and the insulating layer by heating.

The insulating layer may be formed after oxidizing a surface of the metal layer to form a metal oxide film.

In a step of separating, the optical filter from the first substrate, separation is caused between the metal layer and the insulating layer, typically, between the metal layer and the metal oxide layer, or between the metal oxide layer and the insulating layer, or in the metal oxide layer by using a physical means.

The optical filter is a color filter, a color conversion filter, or a hologram color filter.

The second substrate is made from a plastic substrate. At this moment, the optical film is a film including a color filter, a color conversion filter, or a hologram color filter.

As the second substrate, an optical film can be used. A color film, a polarizing plate, an elliptical polarizing plate composed of a retardation plate and a polarizing plate, and a light reflection film can be used as the optical film. At this time, the optical film having the optical filter exhibits plural optical functions.

It is preferable that the first substrate be a heat-resistant substrate. Typically, a glass substrate, a quartz substrate, a ceramic substrate, a silicon substrate, a metal substrate, and a stainless substrate can be cited as representative examples of the substrate.

As representative examples of the metal layer, an element selected from titanium (Ti), aluminum (Al), tantalum (Ta), tungsten (W), molybdenum (Mo), copper (Cu), chromium (Cr), neodymium (Nd), iron (Fe), nickel (Ni), cobalt (Co), ruthenium (Ru), rhodium (Rh), palladium (Pd), osmium (Os), iridium (Ir); a single layer composed of an alloy material or a compound material containing the above-mentioned elements as its main constituent; a lamination layer of the single layers; and nitrides of these materials can be cited.

The insulating layer is preferably formed of oxides, for example, a single layer of silicon oxide, silicon oxynitride, or metal oxide, or a lamination layer thereof.

The metal oxide layer is a layer that is formed by oxidizing a part of the metal layer by a heat treatment performed at a time of forming the insulating layer or after forming the insulating layer. Typically, the metal oxide layer is an oxide of an element selected from titanium (Ti), aluminum (Al), tantalum (Ta), tungsten (W), molybdenum (Mo), copper (Cu), chromium (Cr), neodymium (Nd), iron (Fe), nickel (Ni), cobalt (Co), ruthenium (Ru), rhodium (Rh), palladium (Pd), osmium (Os), and iridium (Ir).

In the invention, a display device indicates a device using a display element, that is, an image display device. Further, the display device includes all of a module in which a light emitting element is attached with a connector, e.g., a FPC (flexible printed circuit), a TAB (tape automated bonding) tape, or a TCP (tape carrier package); a module having a printed wiring board provided on an end of a TAB tape or a TCP; and a module in that a display element is directly mounted with an IC (integrated circuit) or a CPU by the COG (chip on glass) technique.

According the following embodiments, an optical filter can be formed over a plastic substrate. That is, an optical film in which an optical filter is formed over a plastic substrate can be manufactured. Since the optical film manufactured according to the invention has flexibility, the optical film can be provided on a portion or a display device having a curved surface. Further, the optical film is not subjected to a treatment at high temperatures, and hence, the optical film can be formed to have high reliability with high yield. In addition, an optical film having an excellent impact resistance property can be formed.

A display device using the optical film manufactured according to the invention has a structure in which a layer with elements formed therein and the optical film are separately formed through different steps, and subsequently the layer and the optical film are attached to each other. By utilizing the structure, yield of the layer with elements formed therein, i.e., a TFT and a display element, and yield of the optical film can be controlled individually, thereby suppressing the decrease of the yield for the display device totally.

Further, steps for manufacturing an active matrix substrate and steps for manufacturing an optical film can be simultaneously run, reducing the manufacturing lead time for a display device.

Furthermore, since a plastic substrate is used, a display device having an improved impact resistance property with reduced weight can be manufactured.

BRIEF DESCRIPTION OF DRAWINGS

FIGS. 7A and 7B are top view and cross sectional view explaining a light emitting display device panel having a color filter according to the invention;

BEST MODE FOR CARRYING OUT THE INVENTION

Figure 1A:
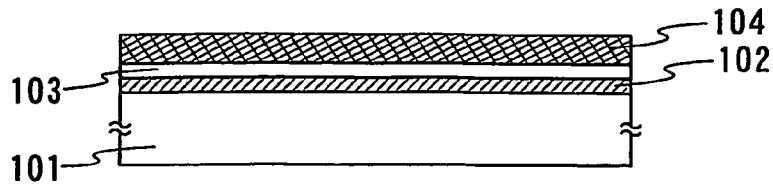
FIGS. 1A to 1E are cross sectional views explaining steps of manufacturing an optical film according to the present invention.

The best modes of the present invention will hereinafter be described with reference to the accompanying drawings. As will be easily understood by the person skilled in the art, the present invention can be embodied in several forms, and the embodiment modes and its details can be changed and modified without departing from the purpose and scope of the present invention. Accordingly, interpretation of the present invention should not be limited to descriptions mentioned in embodiment modes. Note that, portions identical to each other are denoted by same reference numerals in the accompanying drawings, and will not be further explained.

Embodiment Mode 1

A method of manufacturing an optical film over a plastic substrate will be described with reference to FIGS. 1A to 1E.

Firstly, a metal layer 102 is formed on a first substrate 101 as shown in FIG. 1A. As the first substrate, a heat-resistant material, that is, a material that can withstand a heat treatment in a step of manufacturing the optical film and a step of separating is used. Typically, a glass substrate, a quartz substrate, a ceramic substrate, a silicon substrate, a metal substrate, or a stainless substrate can be used.

The metal layer 102 may be formed of an element selected from titanium (Ti), aluminum (Al), tantalum (Ta), tungsten (W), molybdenum (Mo), copper (Cu), chromium (Cr), neodymium (Nd), iron (Fe), nickel (Ni), cobalt (Co), ruthenium (Ru), rhodium (Rh), palladium (Pd), osmium (Os), iridium (Ir); a single layer composed of an alloy material or a compound material containing the above-mentioned elements as its main constituent; or a lamination layer of the single layers; or nitrides of these, typically a single layer composed of molybdenum or an alloy containing molybdenum or a lamination layer thereof. Note that, conditions of the subsequent separating step are changed by adjusting the composition ratio of metal for alloy in the metal layer, or the composition ratio of oxygen or nitrogen contained in the metal layer, properly. Therefore, the separating step can be adapted to various kinds of processing. The film thickness of the metal layer 102 is set to 10 to 200 nm, preferably, 50 to 75 nm.

Next, an oxide layer 103 is formed on the metal layer or the nitride layer 102. At this moment, a metal oxide layer is formed between the metal layer 102 and the oxide layer 103. When separating is caused in the subsequent step, separation will be caused inside the metal oxide layer, in an interface between the metal oxide layer and the oxide layer, or in an interface between the metal oxide layer and the metal layer. As for the oxide layer 103, a layer composed of silicon oxide, silicon oxynitride, or metal oxide may be formed by sputtering or plasma CVD. It is desirable that the film thickness of the oxide layer 103 be approximately 1 to 3 times, preferably, at least 1.5 to 2 times as large as that of the nitride layer or the metal layer 102. A silicon oxide film is formed by sputtering using silicon oxide target to have a thickness of from 75 to 200 nm, here.

An optical filter 104 is next formed on the oxide layer 103. As representative examples of the optical filter, a color filter, a color conversion filter, a hologram color filter, and the like can be cited.

Figure 1B:
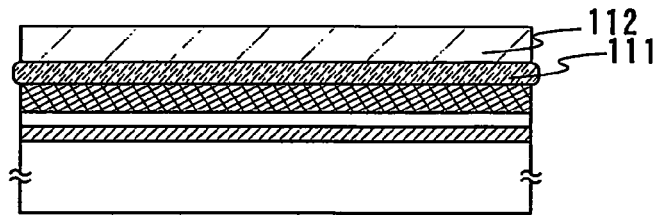

As shown in FIG. 1B, a second substrate 112 for fixing the optical filter 104 is next pasted with an adhesive material 111. As for the adhesive material, various kinds of adhesive materials including a reactive curing adhesive material, a thermal curing adhesive material, a light curing adhesive material such as an ultraviolet curing adhesive material, an anaerobic curing adhesive material can be cited. As representative examples of these materials, an organic resin such as an epoxy resin, an acrylic resin, and a silicon resin can be cited.

The second substrate 112 is formed of a plastic substrate (a film made from a high molecular weight material or a resin). As representative examples of the plastic substrate, plastic substrates made from polycarbonate (PC); ARTON formed of norbornene resin with a polar group that is manufactured by JSR corporation; polyethylene terephthalate (PET); polyether sulfone (PES); polyethylene naphthalate (PEN); nylon; polyether ether ketone (PEEK); polysulfone (PSF); polyetherimide (PEI); polyarylate (PAR); polybutylene terephthalate (PBT); polyimide; and the like can be used. Besides, an optical film such as a polarizing plate, a retardation plate, and a light diffusing film can be used as the second substrate.

Figure 1C:
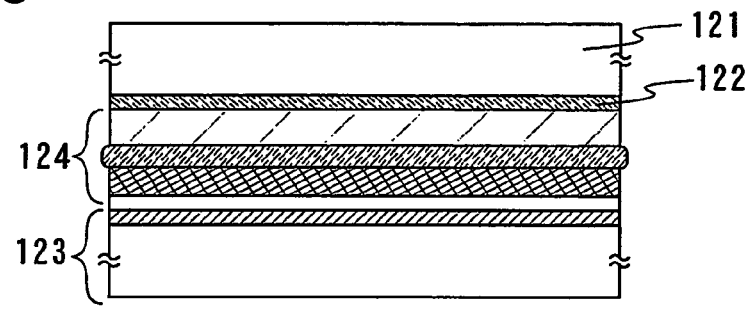

Subsequently, as shown in FIG. 1C, a first support medium 121 is attached to the second substrate 112 with a peelable adhesive agent 122. At this moment, when air bubbles intrude between the second substrate 112 and the peelable adhesive agent 122, cracks are easily caused in the optical filter in the subsequent separating step. In order to prevent cracking, the first support medium is attached thereto so as not to intrude air bubbles between the second substrate 112 and the peelable adhesive agent 122. Note that, the fist support medium can be attached at short times without intruding air bubbles therebetween by using a tape mounter device and the like.

As the peelable adhesive agent 122, the followings can be cited: a material formed of an adhesive material that is made from an organic resin, typically, various kinds of peelable adhesives including a reactive peeling adhesive, a thermal peeling adhesive, a light peeling adhesive such as an ultraviolet ray peeling adhesive, an anaerobic peeling adhesive, and the like; or a member having adhesive layers formed of the various peelable adhesives on each surface thereof (typically, a two-sided tape, and a two-sided sheet).

It is preferable to use a substrate having higher rigidity than that of the second substrate, typically, a glass substrate, a quartz substrate, a metal substrate, or a ceramic substrate as the first support medium.

Furthermore, it is preferable that a substrate having higher rigidity than that of the first and second substrates be employed as the first support medium.

In the case where the surface of the optical filter 104 is uneven, a planarizing layer may be formed on the surface of the optical filter as a buffer layer. Typically, an organic resin, an organic or an inorganic insulating coating film, an insulating film planarized by the CMP (chemical-mechanical polishing) technique and the like, an adhesive, and the like can be cited. Note that, the insulating film may have a single layer or a lamination structure. Besides, the planarizing layer may be formed by using both the insulating film and the adhesive.

In FIG. 1C, the first substrate 101 and the metal layer 102 formed thereon are referred to as a separation body 123. Meanwhile, layers from the oxide layer 103 to the second substrate 112 (that is, layers sandwiched between the metal layer 102 and the peelable adhesive agent 122) are referred to as a subject body 124.

It is preferable that a support medium be bonded to the first substrate 101 with a peelable adhesive agent so as to prevent breakage of each substrate. By bonding the support medium thereto, the separating step, that will be carried out later, can be performed with a smaller force. Preferably, a substrate having higher rigidity than that of the first substrate, typically, a quartz substrate, a metal substrate, and a ceramic substrate are used as the support medium.

Figure 1D:
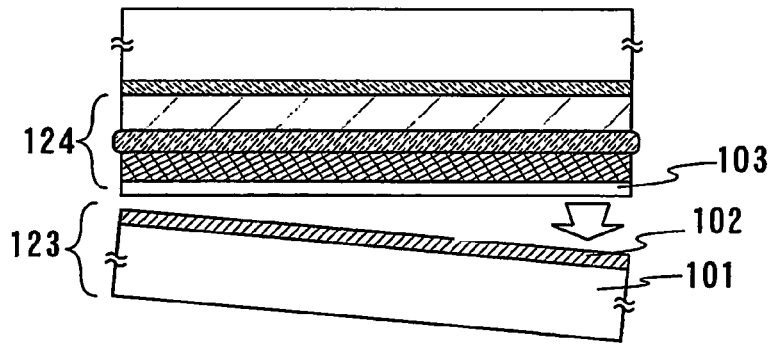

As shown in FIG. 1D, a separation body 123 is next separated from the subject body 124 by a physical means. For example, the physical force indicates a relatively small force such as human hands, gas pressure applied from a nozzle, and ultrasonic waves.

As a result, separation is caused inside the metal layer 102, inside the metal oxide layer, in an interface between the metal oxide layer and the oxide layer 103, or in an interface between the metal oxide layer and the metal layer so that the separation body 123 can be separated from the subject body 124 with a relatively small force.

Note that, in order to separate the separation body easily, a pretreatment is preferably carried out as a previous step prior to the separating step. Typically, a treatment for partly reducing the adhesiveness between the metal layer 102 and the oxide layer 103 is performed. The treatment for partly reducing the adhesiveness therebetween is the one performed by partly irradiating laser beam to the metal layer 102 along a rim of a region to be separated, or the one performed by partly damaging inside or an interface of the metal layer 102 by locally applying pressure along a rim of a region to be separated from an external portion. Specifically, a hard needle such as a diamond pen may perpendicularly be pressed and moved while applying load thereto. Preferably, a scriber device can be used to move the hard needle while applying the pressure with press force in the range of from 0.1 mm to 2 mm. Thus, it is important to form a portion where a separating phenomenon is easily caused, that is, a trigger of the separating phenomenon, prior to performing the separating step. By performing the pretreatment of selectively (partly) reducing the adhesiveness in advance, poor separation can be prevented, thereby improving the yield.

Figure 1E:
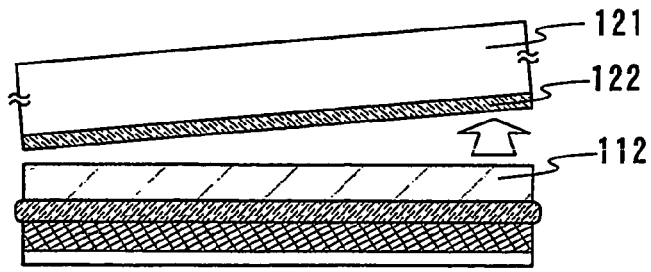

As illustrated in FIG. 1E, the peelable adhesive agent 122 and the first support medium 121 are next separated from the second substrate 112.

According to the above-described steps, the optical film can be formed. Namely, the optical filter 104 can be formed over the second substrate 112.

Note that, the organic resin 111 that is an adhesive material is interposed between the optical filter 104 and the second substrate 112. Further, the oxide layer 103 is formed on a surface of the optical filter 104; the surface is opposite to another surface of the optical filter 104 on which organic resin is formed.

Further, an optical film such as a polarizing plate, a retardation plate, and a light diffusing film can be used as the second substrate 112. In addition, a known antireflection film can be formed on a surface of the second substrate or a surface of the oxide layer. By employing the structure, an optical film having plural functions can be formed.

The optical film manufactured in the embodiment mode has flexibility, and hence, it can be provided on a portion or a display device having a curved surface. Further, the optical filter is not processed at high temperatures, thereby achieving an optical filter having high reliability with high yield. Furthermore, the optical filter having an excellent impact resistance property can be formed.

Embodiment Mode 2

In the present embodiment mode, a method of manufacturing an optical filter having a different adhesion surface between the optical filter and the second substrate from that of Embodiment Mode 1 will be described with reference to FIGS. 2A to 2E.

Figure 2A:
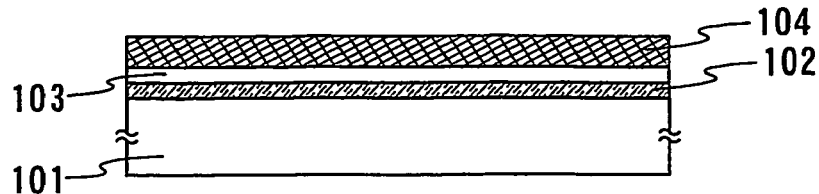
FIGS. 2A to 2E are cross sectional views explaining steps of manufacturing an optical film according to the invention.

As shown in FIG. 2A, the metal layer 102 and the oxide layer 103 are sequentially laminated over the first substrate 101, and the optical filter 104 is formed on the oxide layer 103 in the same manner as Embodiment Mode 1. Note that, a metal oxide layer is formed between the metal layer and the oxide layer.

Figure 2B:
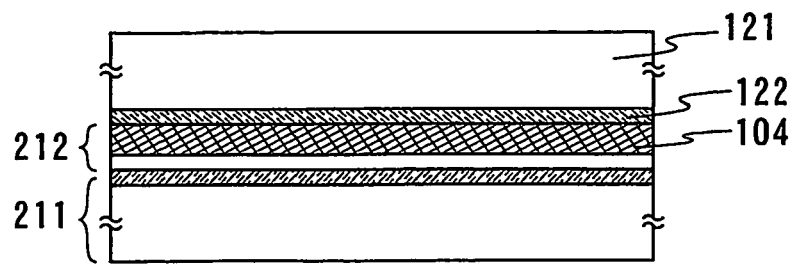

As shown in FIG. 2B, a first support medium 121 is next attached to the optical filter 104 with the peelable adhesive agent 122. The first substrate 101 and the metal layer 102 formed thereon are referred to as a separation body 211, here. Further, the oxide layer 103 and the optical filter 104 (i.e., layers sandwiched between the metal layer 102 and the peelable adhesive agent 122) are referred to as a subject body 212.

Note that, it is preferable that a support medium be attached to the first substrate 101 with a peelable adhesive agent so as to prevent breakage of each substrate. By attaching the support medium thereto, the separating step, that will be performed later, can be carried out with a smaller force. Preferably, the support medium may be formed of a substrate having higher rigidity than that of the first substrate, typically, a quartz substrate, a metal substrate, and a ceramic substrate.

In the case where the surface of the optical filter 104 is uneven, a planarizing layer may be formed on the surface of the optical filter. By providing the planarizing layer, it is possible to prevent atmospheric air from intruding between the optical filter and the peelable adhesive agent, thereby improving the reliability of the separating step. The planarizing layer can be formed of a material that can be made by application such as an insulating coating film and an organic resin. When the planarizing layer is formed of a peelable material, typically, an adhesive, the planarizing layer can be removed later.

Figure 2C:
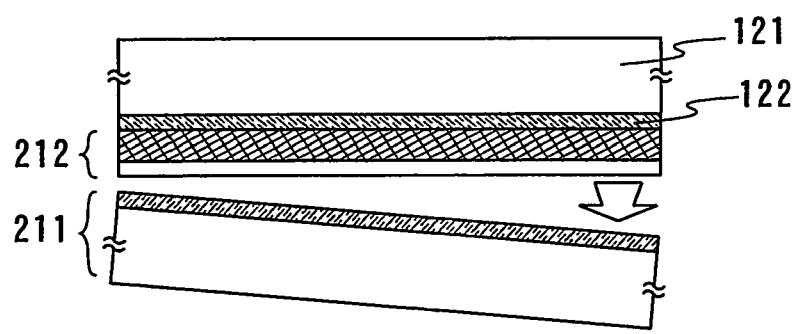

As shown in FIG. 2C, the separation body 211 is next separated from the subject body 212 by a physical means. In order to separate easily, a pretreatment as described in Embodiment Mode 1 is preferably carried out as a previous step prior to the separating step. According to the pretreatment, separation is caused inside the metal oxide layer, in an interface between the metal oxide layer and the oxide layer, or in an interface between the metal oxide layer and the metal layer, thereby separating the separation body 211 from the subject body 212 by a relatively small force. Note that, the physical means mentioned in Embodiment Mode 1 is adapted.

Figure 2D:
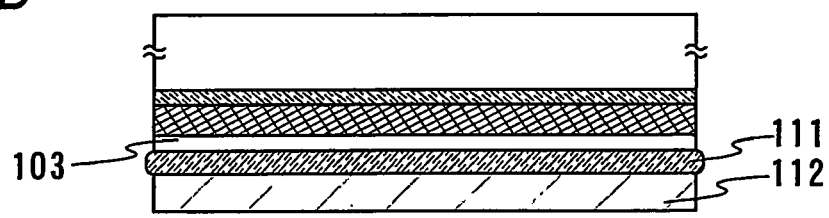
Figure 2E:
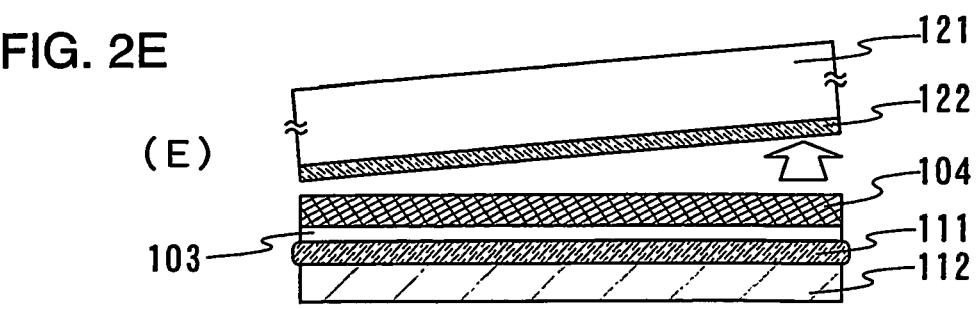

As shown in FIG. 2D, the second substrate 112 is next attached to the oxide layer 103 with the adhesive material 111. Thereafter, the peelable adhesive agent 122 and the first support medium 121 are separated from the optical filter 104.

According to the above-described steps, the optical film can be formed. Namely, the optical filter 104 can be formed over the second substrate 112.

Note that, the organic resin 111 that is an adhesive material and the oxide layer 103 are interposed between the second substrate 112 and the optical filter 104 that is formed in the present embodiment mode.

Alternatively, the separating step may be carried out after forming a transparent conductive film on the surface of the optical filter 104. In accordance with the step, the optical film having a pixel electrode can be formed.

Also, an optical film such as a polarizing plate, a retardation plate, and a light diffusing film can be used as the second substrate 112. In addition, a known antireflection film can be formed on a surface of the second substrate or a surface of the oxide layer. By employing the structure, an optical film having plural functions can be formed.

The optical film manufactured in the embodiment mode has flexibility, and therefore, it can be provided on a portion or a display device having a curved surface. Further, the optical filter is not processed at high temperatures, thereby achieving an optical filter having high reliability with high yield. Furthermore, an optical filter having an excellent impact resistance property can be formed.

Embodiment Mode 3

With respect to Embodiment Mode 1 or Embodiment Mode 2, an easier separating step in an interface between a separation body and a subject body will be described in the present embodiment mode.

After forming the metal layer 102 and the oxide layer 103 over the first substrate 101, the resultant first substrate is heated. Thereafter, the optical filter 104 is formed on the oxide layer. By performing the steps, separation can be caused between the metal layer 102 and the oxide layer 103. At this moment, the first substrate can be heated at temperature ranges that can be withstood by the first substrate, typically, in a range of 100 to 600° C., preferably, 150 to 500° C.

As substitute for the step of the heat treatment, laser beam may be irradiated from the side of the first substrate 101. Further, a combined treatment of the laser irradiation and the heat treatment may be carried out.

A continuous wave solid-state laser or a pulsed solid-state laser can be used here. Typically, as the continuous wave solid-state laser or the pulsed solid-state laser, one or more of the following lasers can be used: a YAG laser; a YVO$_4$ laser; a YLF laser; a YAlO$_3$ laser; a glass laser; a ruby laser; an alexandrite laser; and a Ti:sapphire laser. Furthermore, as the other continuous wave laser or pulsed laser, one or more of the following lasers can be used: an excimer laser; an Ar laser; and a Kr laser.

The laser beam can be irradiated to the metal layer from a side of the substrate, or from a side of the oxide layer, or from both sides of the substrate and the oxide layer.

Further, a beam shape of the laser beam may be a circular shape, a triangular shape, a square shape, a polygonal shape, an elliptical shape, or a linear shape. The size of the laser beam may be in any sizes of microns, millimeters, and meters (that may also have a doted shape or a planer shape). Furthermore, in the above-mentioned oxidizing step, a region to be irradiated with the laser beam may be overlapped with a region where has been irradiated with the laser beam immediately before the above-mentioned region, or may not be overlapped therewith. In addition, it is preferable to use a laser beam having a wavelength of from 10 nm to 1 mm, more preferably, from 100 nm to 10 μm.

The optical film manufactured in the embodiment mode can be separated from the first substrate with a smaller physical force, thereby improving yield and its reliability.

Embodiment Mode 4

With respect to Embodiment Mode 1 or Embodiment Mode 2, an easier separating step in an interface between a separation body and a subject body will be described in the present embodiment mode. In the embodiment mode, a heat treatment is performed after forming an optical filter.

The metal layer 102 and the oxide layer 103 are formed over the first substrate 101, the optical filter 104 is formed on the oxide layer 103, and then the resultant first substrate is heated. Thereafter, the second substrate 112 is attached to the optical filter 104 with the adhesive material 111 in Embodiment Mode 1. On the other hand, the first support medium 121 is attached to the optical filter 104 by using the adhesive agent 122 in Embodiment Mode 2.

As substitute for the above-mentioned steps, after forming the metal layer 102 and the oxide layer 103 over the first substrate 101, the resultant first substrate may be heated, and subsequently, the optical filter 104 may be formed on the oxide layer 103.

According to the steps, it is possible to separate the metal layer 102 from the oxide layer 103 between the metal layer 102 and the oxide layer 103 by a smaller physical means. At this moment, the first substrate can be heated at temperature ranges that can be withstood by the first substrate, typically, in a range of 100 to 300° C., preferably, 150 to 250° C.

In addition, as substitute for the step of the heat treatment, laser beam may be irradiated from a side of the first substrate 101 in the same manner as Embodiment Mode 3. Alternatively, a combined treatment of laser irradiation and heat treatment may be carried out.

The optical film manufactured in the embodiment mode can be separated from the first substrate with a smaller physical force, thereby improving yield and its reliability.

Embodiment Mode 5

A method of manufacturing an optical film through a different step of forming a metal oxide film from Embodiment Mode 1 and Embodiment Mode 2 will be explained in the present embodiment mode.

A metal layer 102 is formed over the first substrate 101 in the same manner as Embodiment Mode 1 and Embodiment Mode 2. A metal oxide layer is next formed on a surface of the metal layer 102. As the method of forming the metal oxide layer, a thermal oxidation treatment, an oxygen plasma treatment, a treatment with strong oxidizing solution such as ozone water, and the like can be cited. By using any one of the above-mentioned treatments, the surface of the metal layer 102 is processed to form the metal oxide layer with a thickness of from 1 to 10 nm, preferably, from 2 to 5 nm.

Thereafter, the oxide layer 103 and the optical filter 104 are formed in the same manner as Embodiment Mode 1 or Embodiment Mode 2 so that the optical film is formed.

The metal oxide layer, which is a part of the separation layer, can be formed in the present embodiment mode, thereby being capable of forming the optical film with high yield.

Embodiment 1

An example of attaching an optical filter formed over a glass substrate to a plastic substrate will be explained according to the invention with reference to FIGS. 3A to 3E and FIGS. 4A to 4D. Although a color filter is used as a representative example of the optical filter in the present embodiment, a color conversion filter, a hologram color filter, and the like can be used in place of the color filter.

Figure 3A:
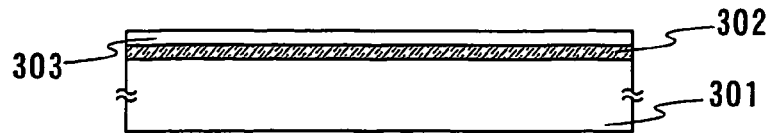
FIGS. 3A to 3E are cross sectional views explaining steps of manufacturing a substrate having a color filter according to the invention.

As shown in FIG. 3A, a separation layer is formed over a glass substrate (a first substrate 301). An AN100 is used as the glass substrate in the embodiment. A metal layer 302, i.e., a molybdenum film (with a thickness of from 10 to 200 nm, preferably, from 50 to 75 nm) is formed on the glass substrate by sputtering. Subsequently, an oxide film 303, i.e., a silicon oxide film (with a thickness of from 10 to 400 nm, preferably, from 75 to 150 nm), is laminated thereon. Upon laminating the oxide layer, a metal oxide film (i.e., a molybdenum oxide film) is formed between the metal layer 302 and the silicon oxide film 303. In the subsequent separating step, separation is caused inside the molybdenum oxide film; in an interface between the molybdenum oxide film and the silicon oxide film; or in an interface between the molybdenum oxide film and the molybdenum film.

Figure 3B:
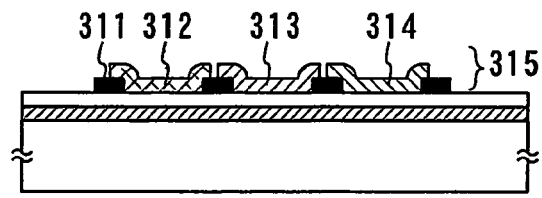

As depicted in FIG. 3B, a color filter is formed on the oxide layer 303. As a method of manufacturing the color filter, the following known methods can be employed: an etching method using a colored resin; a color resist method using color resist; a dyeing method; an electrodeposition method; a micelle electrolytic method; an electrodeposition transfer method; a film diffusion method; an ink jet method (a droplet discharging method); a silver-salt coloring method; and the like.

In the present, a color filter is formed by the etching method using a photosensitive resin in which pigments are dispersed. Firstly, a photosensitive acrylic resin in which black pigments are dispersed is applied on the oxide layer 303 by application. The acrylic resin is dried, baked preliminarily, and then is exposed and developed. Thereafter, the acrylic resin is heated at a temperature of 220° C. to be cured so that a black matrix 311 with a thickness of from 0.5 to 1.5 μm is formed. Subsequently, a photosensitive acrylic resin in which a red pigment is dispersed, a photosensitive acrylic resin in which a green pigment is dispersed, and a photosensitive acrylic resin in which a blue pigment is dispersed are applied over the substrate by application, respectively. Each photosensitive acrylic resin is subjected to the same steps of forming the black matrix so that a red colored layer 312 (hereinafter, referred to as a colored layer R), a green colored layer 313

(hereinafter, referred to as a colored layer G), and a blue colored layer 314 (hereinafter, referred to as a colored layer B) are formed to have thicknesses of from 1.0 to 2.5 μm, respectively. Thereafter, a protective film (not shown) is formed to complete a color filter 315.

In the present specification, the colored layer R represents a colored layer that transmits red light (having the peak wavelength in the vicinity of 650 nm) therethrough. The colored layer G represents a colored layer that transmits green light (having the peak wavelength in the vicinity of 550 nm) therethrough. Further, the colored layer B represents a colored layer that transmits blue light (having the peak wavelength in the vicinity of 450 nm) therethrough.

Figure 3C:
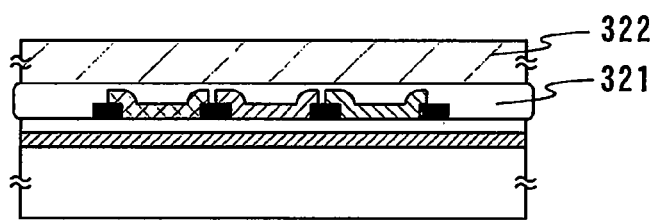

As illustrated in FIG. 3C, a plastic substrate 322 is attached to the color filter 315 with an adhesive material 321. As for the adhesive material 321, an epoxy resin that is a light curing adhesive material is employed. A polycarbonate film is used as the plastic substrate 322.

Figure 3D:
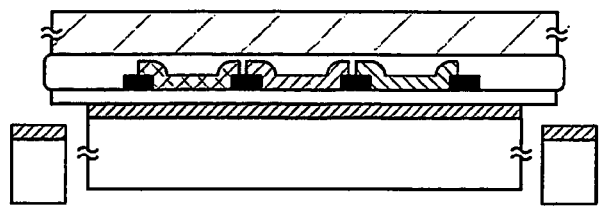

Subsequently, as illustrated in FIG. 3D, a pretreatment is performed to carry out a separating treatment easily. By using a scriber device, a hard needle is moved while applying the pressure with press force in the range of from 0.1 mm to 2 mm so as to remove edges of the substrate. At this moment, separation is caused between the metal layer 302 and the oxide layer 303. By reducing the adhesiveness selectively (partly) in advance in the pretreatment, poor separation can be prevented, thereby improving the yield.

Figure 3E:
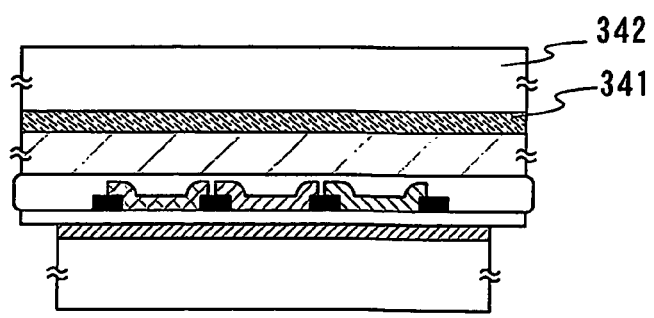

As shown in FIG. 3E, a first support medium 342 is attached to the plastic substrate 322 by using a peelable adhesive agent 341. A two-sided tape is used as the peelable adhesive agent 341, whereas a quartz substrate is used as the first support medium 342. By attaching the first support medium to the plastic substrate, crack and breakage of the color filter can be prevented.

Figure 4A:
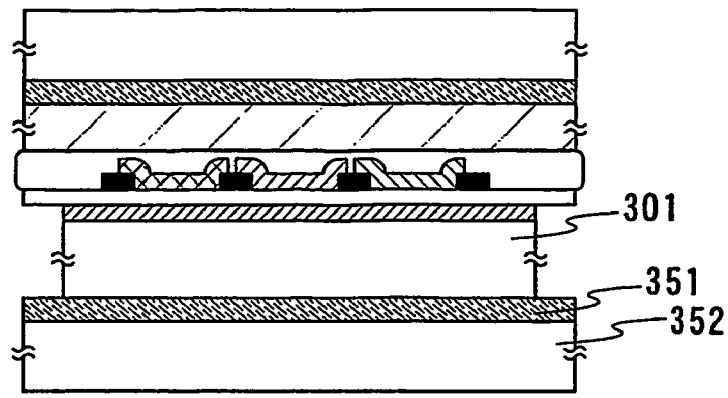
FIGS. 4A to 4D are cross sectional views explaining steps of manufacturing a substrate having a color filter according to the invention.

Next, as shown in FIG. 4A, a second support medium 352 is attached to the first substrate 301 by using a peelable adhesive agent 351. A two-sided tape is used as the peelable adhesive agent, whereas a quartz substrate is used as the second support medium here as well as the first support medium.

Figure 4B:
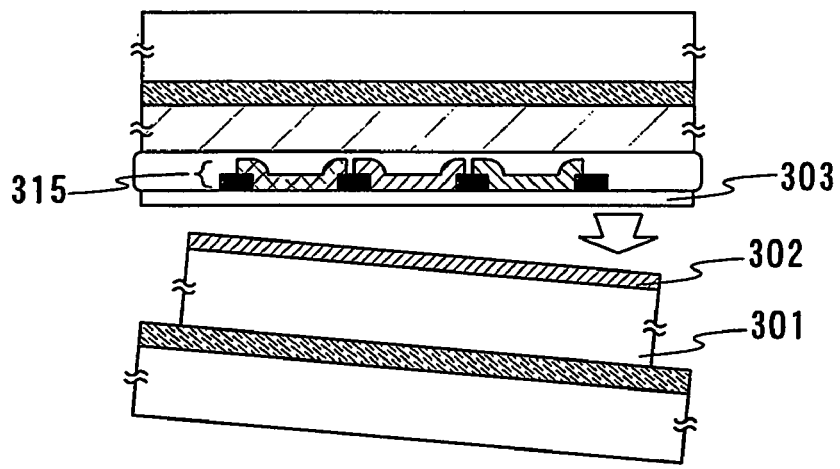

As shown in FIG. 4B, the first substrate 301 is next separated from the color filter 315. As illustrated in FIG. 3B, in a portion where is subjected to the pretreatment in order to perform the separating treatment easily, that is, in a region where the adhesiveness between the metal layer 302 and the oxide layer 303 is partly reduced, the first substrate 301 with the metal layer 302 formed thereon and the second support medium 352 are separated by a physical means. The separation can be performed by a relatively small force (for example, load with use of a member, human hands, gas pressure applied from a nozzle, and ultrasonic waves, and the like). In the present embodiment, a part of a member having a sharp end such as a wedge is inserted between the metal layer 302 and the oxide layer 303 to separate the two layers. Thus, the color filter 315 formed on the silicon oxide layer 303 can be separated from the first substrate 301 and the metal layer 302.

Figure 4C:
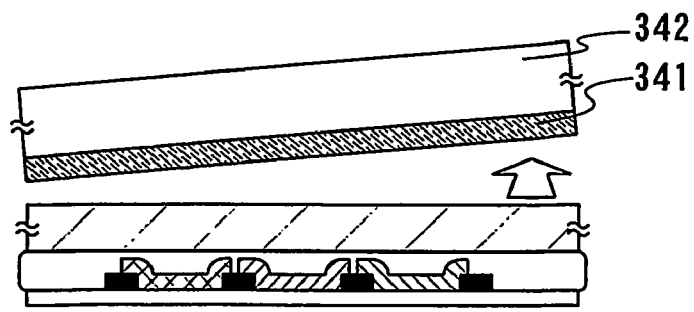

Next, the first support medium 342 is separated from the plastic substrate 322 as illustrated in FIG. 4C. If the adhesive material remains on the plastic substrate, the residue of the adhesive material might cause defects. Therefore, it is preferable that the surface of the plastic substrate 322 be washed by $O_2$ plasma irradiation, ultraviolet ray irradiation, or ozone cleaning. In addition, vacuum heating may be performed so as to remove adsorbed moisture on the plastic substrate.

Figure 4D:
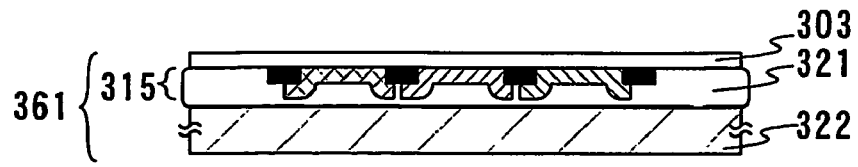

According to the above-described steps, the color filter 315 is formed on the plastic substrate 322 while sandwiching the organic material that is the adhesive material therebetween, as shown in FIG. 4D. Note that, the oxide layer 303 is formed on the surface of the color filter. The color filter 315, the oxide layer 303 formed on the surface of the color filter, the adhesive material (resin layer) 321, and the plastic substate 322 are referred to as a substrate 361 having the color filter.

Figure 9A:
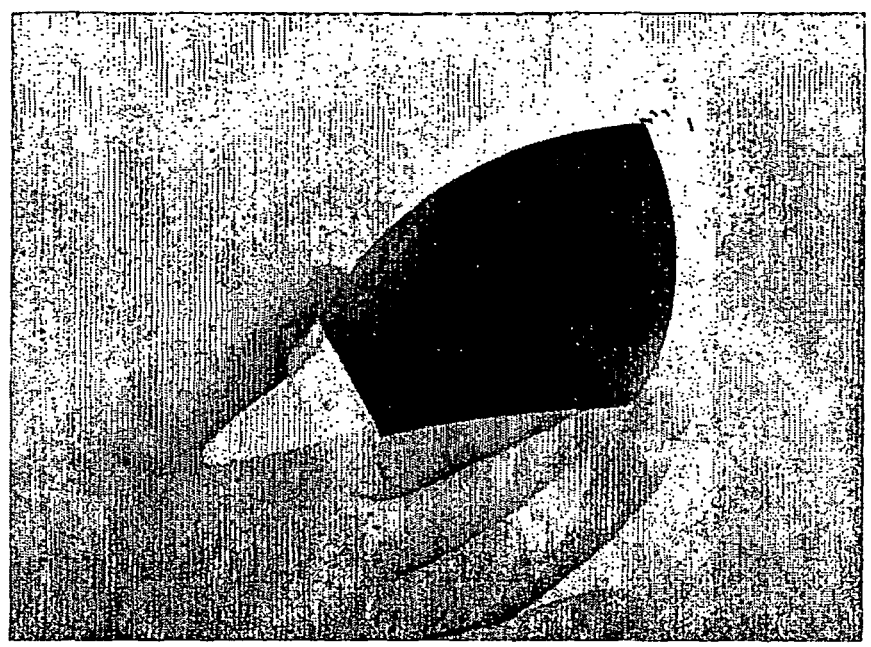
FIGS. 9A and 9B are diagrams explaining a substrate having a color filter that is manufactured according to the invention.
Figure 9B:
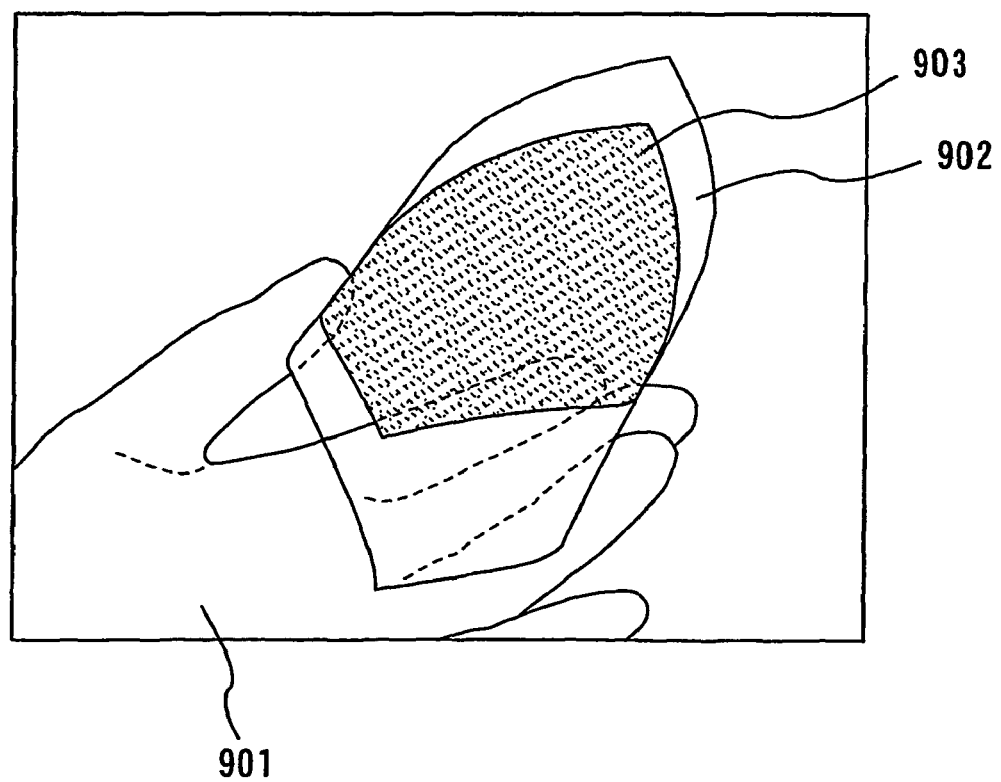

FIG. 9A shows a photograph of the substrate having the color filter that is manufactured in the present embodiment. FIG. 9B is a pattern diagram of FIG. 9A, wherein reference numeral 901 denotes a hand; 902, a plastic substrate; and 903, a color filter. The plastic substrate is curved since it has flexibility.

Note that, Embodiment Mode 2 is applicable to the present embodiment in place of Embodiment Mode 1.

In accordance with the embodiment, a color filter can be formed on a plastic substrate. Furthermore, by forming a color filter on an optical film such as a polarizing plate, a retardation plate, and a light diffusing film, an optical film integrated with plural functions can be formed.

The plastic substrate having the color filter manufactured according to the present embodiment has flexibility, and hence, it can be provided on a portion or a display device having a curved surface. Further, since the color filter is not processed at high temperatures, the substrate having the color filter can be manufactured so as to have high reliability with high yield. Furthermore, the substrate having the color filter, that comprises an excellent impact resistance property, can be formed.

Embodiment 2

In the present embodiment, an example of a light emitting display device having the color filter manufactured in Embodiment 1 will be described with reference to FIGS. 5A and 5B.

Figure 5A:
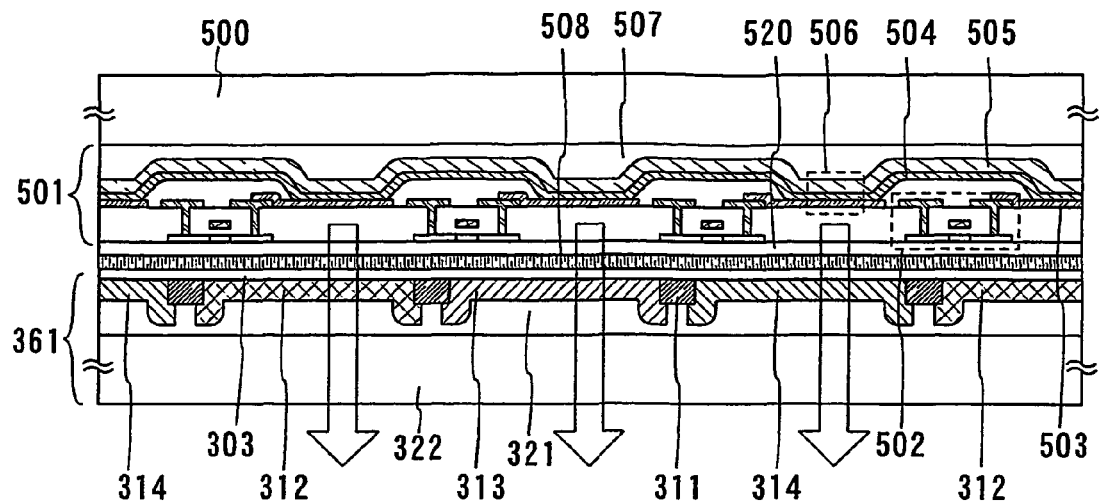
FIGS. 5A and 5B are cross sectional views explaining a light emitting display device having a color filter according to the invention.

A light emitting display device, which can emit light downward, is illustrated in FIG. 5A. In FIG. 5A, reference numeral 501 denotes a layer with elements formed therein; 361, the substrate having the color filter manufactured in Embodiment 1; and 500, a second substrate.

In the layer with the elements formed therein, a TFT 502 is formed as a semiconductor element over an insulating film 520. The structure of the TFT 502 is not particularly limited, and a top-gate TFT (typically, a planar TFT) or a bottom-gate TFT (typically, an inverted stagger type TFT) may be used. As for the elements, an organic semiconductor transistor, a diode, or an MIM element can be used as substitute for the TFT.

A first electrode made from a conductive oxide film is connected to the TFT 502 as a pixel electrode. In the present embodiment, the first electrode is used as an anode 503. A second electrode is opposed to the first substrate while sandwiching a layer containing a luminescent substance therebetween. The second electrode is used as a cathode 505 here. The conductive oxide film used here is transparent to visible light. Light generated in a light emitting layer is extracted to outside (in a direction of arrows in the drawing) through the anode 503. The TFT 502 and the anode 503 are provided in each of a plurality of pixels.

A light emitting layer 504 is formed so as to be in contact with the anode 503, and the cathode 505 is formed thereon. The light emitting layer 504 corresponds to a light emitting portion of a light emitting element, and is composed of a single layer or a lamination layer. Basically, the light emitting layer comprising a hole injecting layer, a hole transporting layer, an electron injecting layer, and an electron transporting layer. Besides, the light emitting layer may be composed of any known structures. As a material for the light emitting layer, either an organic material or an inorganic material can be used. In the case of using the organic compound, either a high molecular weight organic material or a low molecular weight organic material may be used.

The cathode is preferably made from a material having a low work function, and a metal film containing an element that belongs to the group 1 or 2 of the periodic table may be used. Of course, any known cathode materials can be employed.

In the present specification, the light emitting element indicates a light emitting element including an anode, a light emitting layer, and a cathode. Therefore, a light emitting element 506 is composed of the anode 503, the light emitting layer 504, and the cathode 505.

Since the anode 503 has a light transmitting property while the cathode 505 has a light shielding property or a light reflecting property, the light emitting element emits light toward the anode, that is, toward the TFT (i.e., bottom emission, here). Accordingly, the substrate 361 having the color filter, which is formed in Embodiment 1, is attached to a surface through which light is emitted, i.e., a surface of the insulating film 520 of the layer 501 with elements formed therein, which is the TFT side of the layer 501 with elements formed therein, by using an adhesive material 508.

Meanwhile, the light emitting element 506 is covered with a sealing material 507, and a second substrate 500 is attached to the light emitting element with the sealing material 507. The sealing material 507 is composed of a resin, and an ultraviolet curing resin or an epoxy resin is typically used.

The second substrate 500 protects the light emitting element 506 from moisture and oxygen, and also functions as a protective layer for protecting the light emitting element 506 from mechanical shock. Although the second substrate 500 may be formed of any materials, it is preferable that a plastic substrate be used so as to reduce the weight of the light emitting display device and enhance an impact resistance property. A polycarbonate (PC) film is used as the plastic substrate in the present embodiment.

Steps of manufacturing the light emitting display device as shown in FIG. 5A will be explained below.

The layer 501 with the elements formed therein that is formed by a known method, is formed on a first substrate (not illustrated in the drawing). The second substrate 500 is attached to the layer 501 with the elements formed therein by using a sealing material 507. Thereafter, the first substrate is removed from the layer 501 with the elements formed therein. As a method of removing the first substrate, a step of separating the first substrate, a step of polishing the first substrate, a step of melting the first substrate, and the like may properly be applied. Note that, the first substrate may be polished thinly to use as the second substrate. In the present embodiment, by utilizing the same technique as Embodiment Mode 1 or Embodiment Mode 2, a metal layer, an oxide layer, and the layer with elements formed therein are sequentially laminated over the first substrate. Then, separation is caused between the metal layer and the oxide layer to remove the first substrate from the layer 501 with the elements formed therein.

Next, the substrate 361 having the color filter manufactured in Embodiment 1 is attached to the insulating film 520 of the layer 501 with the elements formed therein by using an adhesive material 508. Here, the insulating film 520 is formed on a surface through which the light emitting element emits light, i.e., a surface of the layer 501 with the elements formed, which is opposite to another surface of the layer 501 with the elements formed therein on which the second substrate 500 is formed. As representative examples of the adhesive material 508, the ultraviolet curing resin or the epoxy resin can be cited.

According to the steps above, the light emitting display device using the plastic substrate and the color filter formed on the plastic substrate (bottom emission type light emitting display device) can be manufactured.

Figure 5B:
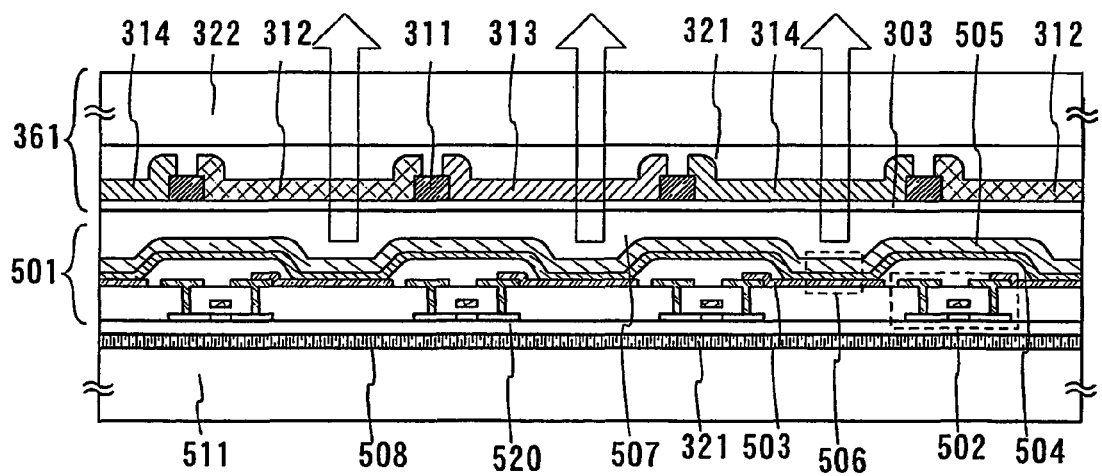

Next, a light emitting display device that can emit light upward is shown in FIG. 5B.

In FIG. 5B, reference numeral 501 denotes the layer with the elements formed therein; 361, the substrate having the color filter manufactured in Embodiment 1; and 511, the second substrate.

The TFT 502 and the light emitting element 506 are formed in the layer 501 with the elements formed therein as well as FIG. 5A. With respect to the light emitting element, an anode comprises a light shielding property or a light reflecting property, whereas a cathode comprises a light transmitting property. Therefore, the light emitting element as shown in FIG. 5B emits light toward the cathode, that is, in the opposite direction of the TFT 502 (i.e., top-emission, here). The light emitting element 506 is covered with the sealing material 507.

The substrate 361 having the color filter formed in Embodiment 1 is attached to a side through which light is emitted, i.e., a surface of the layer 501 with the elements formed therein, which is opposite to another surface of the layer 501 with the elements formed therein on which TFT is formed by using the sealing material 507. The sealing material 507 is a resin, and the ultraviolet curing resin or the epoxy resin is typically used. Note that, an adhesive material may additionally be provided between the sealing material 507 and the substrate 361 having the color filter.

Meanwhile, at a side of the TFT of the layer with the elements formed therein, i.e., a surface of the layer with the elements formed therein, which is opposite to another surface of the layer with the elements formed therein on which the substrate 361 having the color filter is formed, the insulating film 520 is attached to the second substrate 511 by using the adhesive material 508.

Steps of manufacturing the light emitting display device shown in FIG. 5B will be described below.

The layer 501 with the elements formed therein, which is formed by a known method, is formed on a first substrate (not illustrated in the drawing). The substrate 361 having the color filter manufactured in Embodiment 1 is attached to the layer 501 with the elements formed therein by using the sealing material 507. Thereafter, the first substrate is removed from the layer 501 with the elements formed therein. As a method of removing the first substrate, a step of separating the first substrate, a step of polishing the first substrate, a step of melting the first substrate, and the like may properly be adapted. Note that, the first substrate may be polished thinly to remain. In the present embodiment, by utilizing the same technique as Embodiment Mode 1 or Embodiment Mode 2, a metal layer, an oxide layer, and the layer with elements formed therein are sequentially laminated over the first substrate. Then, separation is caused between the metal layer and the oxide layer to remove the first substrate from the layer 501 with the elements formed therein Subsequently, in the layer 501 with the elements formed therein, the second substrate 511 is attached to the insulating film 520 of the layer 501 with the elements formed therein, i.e., a surface of the layer 501 with the elements formed therein, which is opposed to another surface of the layer 501 with the elements formed therein on which substrate 361 having the color filter is formed, by using the adhesive material 508. As representative examples of the adhesive material 321, the ultraviolet curing resin or the epoxy resin can be cited.

According to the above-mentioned steps, the light emitting device using the plastic substrate and the color filter formed over the plastic substrate (top-emission type light emitting display device) can be manufactured.

Note that, it is preferable to use colored layers of the color filter for the light emitting display device each of which has low pigment content so as to obtain a large amounts of light. Alternatively, the amount of light can be increased by making the film thickness of each colored layer thin. Also, when a black pigment is doped in the colored layers, such a defect that an observer is reflected in a cathode can be prevented by absorbing outside light entered from the outside of the light emitting display device.

Further, an antireflection film may be provided on the surface of the substrate 361 having the color filter. The antireflection film is a single layer film or a lamination film having a condition in which reflected light is hardly caused by controlling a refractive index and a film thickness. A known antireflection film can be used.

Further, a polarizing plate or a circular polarizing plate (including a circular polarizing film) may be used instead of the plastic substrate 322.

Although examples in which the light emitting element emits light in only one direction are shown in the embodiment, the present invention is not limited thereto. The present invention can be applied to a light emitting element, which can emit light in two directions (that is, a light emitting element in that both of an anode and a cathode comprise the light transmitting properties, i.e., a dual-emission type light emitting element). In this case, the layer with the elements formed therein may be interposed between two substrates having color filters.

Although the present embodiment shows the light emitting element driven by an active matrix driving method, wherein TFTs are formed in each pixel electrode, the present embodiment is not limited thereto. A light emitting element driven by a passive matrix driving method may be used properly.

In addition, a light emitting display device may be formed by using an organic semiconductor transistor as an element provided in each pixel electrode, and a plastic substrate as the first substrate. In this case, the step of removing the first substrate can be omitted, thereby increasing throughput.

One feature of the light emitting display devices described in this embodiment is that the layer with the elements formed therein and the color filter are formed individually in the separating steps, and then both are attached to each other after being completed. By taking such a structure, the yield of the layer with the elements, i.e., the TFT and the light emitting element, formed therein, and the yield of the color filter can be controlled individually, which suppresses decline in the yield of the entire light emitting display device.

Furthermore, the steps of manufacturing an active matrix substrate and the steps of manufacturing a color filter can be simultaneously run, thereby reducing manufacturing lead time of the light emitting display device.

By utilizing a plastic substrate, a light emitting display device having reduced weight with an improved impact resistance property can be manufactured.

Embodiment 3

An example of a liquid crystal display device having the color filter manufactured in Embodiment 1 will be explained in the present embodiment.

Figure 6A:
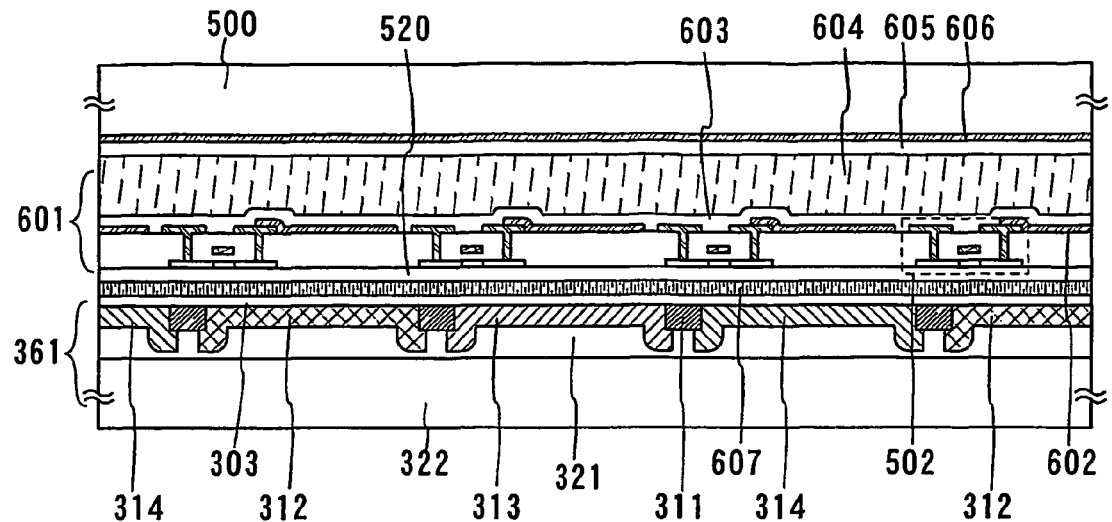
FIGS. 6A and 6B are cross sectional views explaining a liquid crystal display device having a color filter according to the invention.

In FIG. 6A, reference numeral 601 denotes a layer with elements formed therein; 361, the substrate having the color filter manufactured in Embodiment 1; and 500, a second substrate.

A TFT 502 as semiconductor element and a layer to be filled with a liquid crystal later are formed in the layer 601 with the elements formed therein in the same manner as Embodiment 2. A structure of the TFT 502 is not particularly limited, and either a top-gate TFT (typically, a planar TFT) or a bottom-gate TFT (typically, a inverted stagger type TFT) may be used. As substitute for the TFT, an organic semiconductor transistor, a diode, and an MIM element can be used as the element.

A first electrode 602 made from a conductive oxide film is connected to the TFT 502 as a pixel electrode. The conductive oxide film used here is transparent to visible light, and light emitted from an external backlight is extracted to outside through the first electrode 602. The TFT 502 and the first electrode 602 are provided in each of a plurality of pixels.

An alignment film 603 is formed on the first electrode 602. An alignment film that is formed by rubbing polyimide is used in the present embodiment. Besides, an alignment film formed by the oblique deposition with use of silicon oxide, or a photo-alignment film can be used as the alignment film.

A second electrode 606 and an alignment film 605 formed in the same step as the alignment film 603 are formed over the second substrate 500.

The alignment film 605 formed over the second substrate 500 and the layer 601 with the elements formed therein are attached to each other with a sealing material (not shown in the drawing).

A substrate 608 having a color filter is attached to a surface of an insulating film 520 of the layer 601 with the elements formed therein by using an adhesive material 607.

Steps of manufacturing the liquid crystal display device as shown in FIG. 6A will hereinafter be explained.

The second electrode 606 made from the conductive oxide film is formed on the second substrate 500. Thereafter, the alignment film 605 is formed on the surface of the second electrode.

The layer 601 with the elements formed therein is formed on a first substrate (not shown in the drawing) by a known method. The second substrate 500 is attached to the layer 601 with the elements formed therein by using a first sealing material. In this case, the second substrate is attached thereto so that the alignment film 603 formed on the surface of the layer 601 with the elements formed therein and the alignment film 605 formed over the second substrate are faced to each other. Further, a spacer is formed between the two substrates. The first sealing material is mixed with filler such that the two substrates are attached to each other while maintaining an even distance therebetween with the spacer and the filler.

Thereafter, the first substrate is removed from the layer 601 with the elements formed therein. The known techniques as disclosed in Embodiment 2 can be adapted to the step of removing the first substrate. In this embodiment, by utilizing a same technique as Embodiment Mode 1 or Embodiment Mode 2, a metal layer, an oxide layer, and the layer with the elements formed therein are sequentially laminated over the first substrate. Then, separation is caused between the metal layer and the oxide layer to remove the first substrate from the layer 601 with the elements formed therein.

Subsequently, the substrate 361 having the color filter and the insulating film 520 of the layer 601 with the elements formed therein are attached to each other with the adhesive material 607.

A liquid crystal material 604 is injected between the two substrates, that is, in the layer 601 with the elements formed therein, and the two substrates are completely sealed with a second sealing material (not illustrated in the drawing).

According to the above-mentioned steps, the liquid crystal display device using the plastic substrate and the color filter formed over the plastic substrate can be manufactured.

Figure 6B:
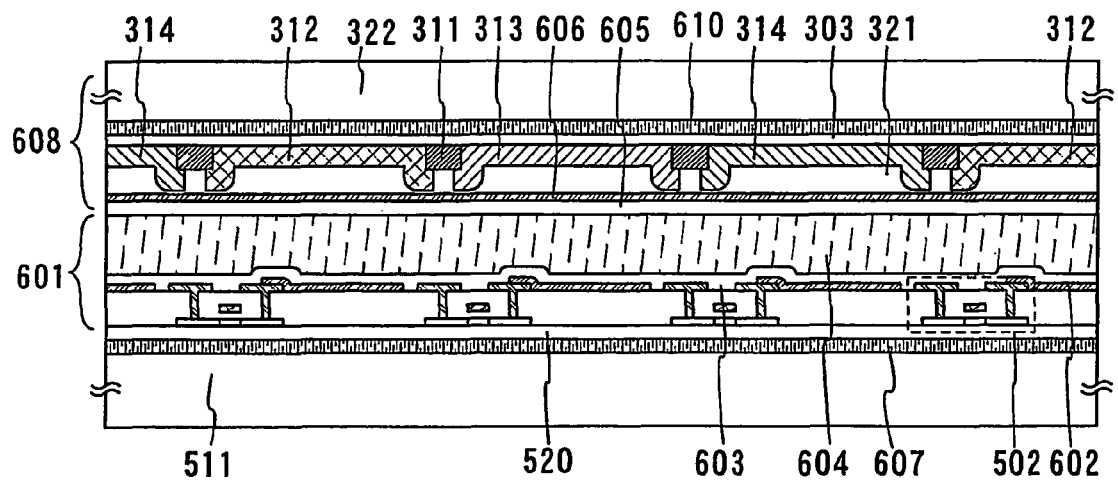

Next, in FIG. 6B, reference numeral 601 denotes a layer with elements formed therein; 608, a substrate having a color filter; and 511, a second substrate.

The second substrate 511 and an insulating film 520 of the layer 601 with the elements formed therein are attached to each other with an adhesive material 607 composed of an organic resin.

The layer 601 with the elements formed therein is adhered with the substrate 608 having the color filter by a sealing material (not illustrated in the drawing).

The substrate 608 having the color filter is formed in accordance with Embodiment Mode 2. Specifically, an adhesive material 610 comprising organic resin and an oxide layer 303 are laminated over a plastic substrate 322. A black matrix 311, a red colored layer 312, a green colored layer 313, and a blue colored layer 314 are aligned on the oxide layer and an overcoat layer for covering the layers is formed thereon so as to form the color filter. A second electrode 606 is formed over a surface of the color filter, and an alignment film 605 is formed thereon. Note that, it is possible to use a substrate having the color filter in which the second electrode 606 and the alignment film 605 are formed over a surface of the oxide layer 303 of the substrate 361 having the color filter as disclosed in Embodiment 1.

Steps of manufacturing the liquid crystal display device as shown in FIG. 6B will be described below.

The layer 601 with the elements formed therein is formed on a first substrate (not shown in the drawing) by a known method. The substrate 608 having the color filter is attached to the layer 601 with the elements formed therein by using a first sealing material (not illustrated in the drawing). In this case, the substrate 608 having the color filter is attached thereto so that the alignment film 603 formed on the surface of the layer 601 with the elements formed therein and the alignment film 605 formed on the substrate having the color filter are faced to each other. Further, a spacer is formed between the two substrates. The first sealing material is mixed with filler so that the two substrates are attached to each other while maintaining an even distance therebetween with the spacer and the filler.

Thereafter, the first substrate is removed from the layer 601 with the elements formed therein. The known techniques as disclosed in Embodiment 2 can be applied to the step of removing the first substrate. In this embodiment, by utilizing the same technique as Embodiment Mode 1 or Embodiment Mode 2, a metal layer, an oxide layer, and the layer with the elements formed therein are sequentially laminated over the first substrate. Then, separation is caused between the metal layer and the oxide layer to remove the first substrate from the layer 601 with the elements formed therein.

Subsequently, the second substrate 511 and the insulating film 520 of the layer 601 with the elements formed therein are attached to each other with an adhesive material 607.

A liquid crystal material 604 is injected between the two substrates, that is, in the layer 601 with the elements formed therein, and the two substrates are completely sealed with a second sealing material (not illustrated in the drawing).

According to the above-mentioned steps, the liquid crystal display device using the plastic substrate and the color filter formed over the plastic substrate can be manufactured as shown in FIG. 6B.

Note that, it is preferable that the color filter used in the liquid crystal display device has a sharp peak wave length. Also, when a black pigment is doped in colored layers, such a defect that an observer is reflected in a cathode can be prevented by absorbing outside light entered from the outside of the light emitting display device.

Further, an antireflection film may be provided on each surface of the substrates 361 and 608 having the color filters. The antireflection film is a single layer film or a lamination film having a condition in which reflected light is hardly caused by controlling a refractive index and a film thickness. A known antireflection film can be used.

Further, a polarizing plate and a circular polarizing plate (including a circular polarizing film) may be used instead of the plastic substrate 322.

Although the present embodiment shows a liquid crystal element driven by an active matrix driving method, wherein TFTs are provided in each pixel electrode, the present embodiment is not limited thereto. A liquid crystal element driven by a passive matrix driving method can also be used, properly.

In addition, the liquid crystal display device may be formed by using an organic semiconductor transistor as the elements formed in each pixel electrode, and a plastic substrate as the first substrate. In this case, the step of removing the first substrate can be omitted, thereby increasing throughput.

One feature of the liquid crystal display device described in this embodiment is that the layer with the elements formed therein and the color filter are formed individually in the separating steps, and then both are attached to each other after being completed. By taking such a structure, the yield of the layer with the elements, i.e., the TFT and the liquid crystal element, formed therein and the yield of the color filter can be controlled individually, which suppresses decline in the yield of the entire liquid crystal display device.

Furthermore, the steps of manufacturing an active matrix substrate and the steps of manufacturing a color filter can be simultaneously run, thereby reducing manufacturing lead time of the entire liquid crystal display device.

By utilizing a plastic substrate, a liquid crystal display device having reduced weight with an improved impact resistance property can be manufactured.

Embodiment 4

In the present embodiment, an exterior appearance of a panel corresponding to one embodiment of a display device will be explained with reference to FIGS. 7A and 7B. FIG. 7A shows a top view of a panel in which a layer 501 with elements formed therein (concretely, a TFT and a light emitting element) is encapsulated between a color filter and a second substrate by using a sealing material. FIG. 7B corresponds to a cross sectional view taken along a line A-A' of FIG. 7A.

Reference numeral 1201 denoted by a doted line is a signal line driver circuit; 1202, a pixel portion; and 1203, a scanning line driver circuit in FIG. 7A. Further, reference numeral 1204 denotes a second substrate and reference numeral 1205 denotes a first sealing material that contains a gap material for maintaining a gap of an enclosed space. The inside surrounded by the sealing material 1205 is filled with a second sealing material. As the first sealing material, an epoxy resin containing filler with high viscosity is preferably used. As the second sealing material, epoxy resin having high light transmitting property with low viscosity is preferably used. Further, it is desirable that the sealing materials 1205 and 1207 be materials that do not transmit moisture and oxygen as much as possible.

In a connection region 1210, reference numeral 1208 denotes a connection wiring for transmitting signals inputted in the signal line driver circuit 1201 and the scanning line driver circuit 1203, and receives a video signal and a clock signal from an FPC (flexible printed circuit) 1209 that becomes an external input terminal.

Next, a cross sectional structure will be described referring to FIG. 7B. A driver circuit and a pixel portion are formed over the first substrate 322. As the substrate 361 having the color filter, a color filter is provided on the first substrate 322. The signal line driver circuit 1201 as the driver circuit, and the pixel portion 1202 are shown here. A CMOS circuit composed by combining an n-channel TFT 1223 and a p-channel TFT 1224 is formed as the signal line driver circuit 1201.

The pixel portion 1202 is composed of a plurality of pixels including a switching TFT 1211, a current controlling TFT 1212, and a first electrode (anode) 1213 made from a transparent conductive film, which is electrically connected to a drain of the current controlling TFT 1212.

An interlayer insulating film 1220 of these TFTs 1211, 1212, 1223, and 1224 may be formed of a material containing an inorganic material (such as silicon oxide, silicon nitride, and silicon oxynitride); or an organic material (such as polyimide, polyamide, polyimide amide, benzocyclobutene, and siloxane polymer) as its principal constituent. When siloxane polymer is used as a raw material of the interlayer insulating film, an insulating film having a skeleton structure of silicon and oxygen and including hydrogen or/and alkyl group in a side chain is formed.

The first electrode 1213 is connected to the connection electrode so as to overlap each other, and is electrically connected to a drain region of the TFTs via the connection electrode. It is preferable that the first electrode 1213 have transparency and be formed of a conductive film having a high work function (such as ITO (indium oxide-tin oxide alloy), indium oxide-zinc oxide alloy ($In_2O_3$—ZnO), and zinc oxide (ZnO)).

An insulator 1214 (referred to as a bank, a partition wall, a barrier, an embankment, etc.) is formed on each end of the first electrode (anode) 1213. To improve coverage of a film formed on the insulator 1214, an upper edge portion or a lower edge portion of the insulator 1214 is formed to have a curved face having a radius of curvature. Further, the insulator 1214 may be covered with a protective film made from an aluminum nitride film, an aluminum nitride oxide film, a thin film containing carbon as its principal constituent, or a silicon nitride film.

An organic compound material is vapor deposited on the first electrode (anode) 1213 to form a layer 1215 containing a luminescent substance selectively.

To remove gases contained in the substrate prior to performing the vapor deposition of the material for the layer containing the luminescent substance, a heat treatment at a temperature of 200 to 300° C. is desirably carried out under a reduced pressure atmosphere or an inert atmosphere.

In order to make the layer 1215 containing the luminescent substance emits white light, for example, white light emission can be achieved by sequentially laminating $Alq_3$, $Alq_3$ partially doped with Nile red, which is a red light emitting pigment, p-EtTAZ, and TPD (aromatic diamine) by using vapor deposition. Further, when an EL layer is formed by application using spin coating, it is preferable to bake the layer by vacuum heating after its application. For example, an aqueous solution of poly(ethylene dioxythiophene)/poly(styrene sulfonic acid) (PEDOT/PSS), which functions as a hole injecting layer, may be applied over the entire surface of the substrate and baked. Subsequently, a solution of polyvinyl carbazole (PVK) doped with a pigment for luminescence center (such as 1,1,4,4-tetraphenyl-1,3-butadiene (TPB), 4-dicyanomethylene-2-methyl-6-(p-dimethylamino-styryl)-4H-pyran (DCM1), Nile red, and coumarin 6), which serves as a light-emitting layer, may then be applied over the entire surface and baked.

The layer 1215 containing the luminescent substance may be formed to have a single layer. In this case, 1,3,4-oxadiazole derivative (PBD), which has electron transporting properties, may be dispersed in polyvinyl carbazole (PVK), which has hole transporting properties. In addition, white light emission can also be obtained by dispersing 30 wt % of PBD as an electron transporting agent and dispersing a suitable amount of four kinds of pigments (TPB, coumarin 6, DCM1, and Nile red). In addition to the above-mentioned light emitting element that emit white light, a light emitting element that emit red light, green light, or blue light can be manufactured by properly selecting the material of the layer 1215 containing the luminescent substance.

Further, triplet excited luminescent materials including metal complexes and the like may be used for the layer 1215 containing the luminescent substance instead of the above-mentioned singlet excited luminescent materials. That is, the layer 1215 containing the luminescent substance may includes pixels emitting red light, pixels emitting green light, and pixels emitting blue light, wherein the pixels emitting red light contain the triplet excited luminescent material or the singlet excited luminescent material, the pixels emitting green light contain the triplet excited luminescent material, and the pixels emitting blue light contains the singlet excited luminescent material.

As a material for the second electrode (cathode) 1216, a material having a low work function (Al, Ag, Li, Ca; alloy of these such as MgAg, MgIn, AlLi, $CaF_2$, and CaN) may be used.

Thus, a light emitting element 1218 composed of the first electrode (anode) 1213, the layer 1215 containing the luminescent substance, and the second electrode (cathode) 1216 can be formed. The light emitting element 1218 emits light in a direction of an arrow shown in FIG. 7B. The light emitting element 1218 is one of light-emitting elements that emit white light. A full color display can be performed by transmitting light emitted from the light emitting element 1218 through the color filter.

Alternatively, when the light emitting element 1218 is one of light emitting elements that emit monochromatic light of R, G, or B, three light emitting elements having layers containing organic compounds, which emit R, G, and B lights respectively, are selectively used, thereby performing a full color display. In this case, a light emitting display device with high color purity can be obtained by aligning of respective colored layers of red, green, and blue for the color filter and the light emitting elements for each luminescent color.

A protective layer 1217 is formed to encapsulate the light emitting element 1218. The protective layer is composed by laminating a first inorganic insulating film, a stress relaxation film, and a second inorganic insulating film.

In the embodiment, the substrate 361 having the color filter is attached to the layer 501 with the elements formed therein by the adhesive material 508 as shown in FIG. 5A of Embodiment 2. Note that, the color filter may be used as the second substrate, and the plastic substrate may be used as the first substrate as shown in FIG. 5B of Embodiment 2.

Although the scanning line driver circuit formed by using the TFTs is shown here, the prevent embodiment is not limited to the structure. Alternatively, a scanning line driver circuit and a signal line driver circuit may be formed of transistors using a single-crystal semiconductor, and attached.

One feature of the light emitting display device described in this embodiment is that the layer with the elements formed therein and the color filter are formed individually in the separating steps, and then both are attached to each other after being completed. By taking such a structure, the yield of the layer with the elements, i.e., the TFT and the light emitting element, formed therein, and the yield of the color filter can be individually controlled, thereby suppressing decline in the yield of the entire light emitting display device.

Furthermore, the steps of manufacturing an active matrix substrate and the steps of manufacturing a color filter can be simultaneously run, thereby reducing manufacturing lead time of the light emitting display device.

By utilizing a plastic substrate, a light emitting display device having reduced weight with an improved impact resistance property can be manufactured.

Embodiment 5

Figure 8A:
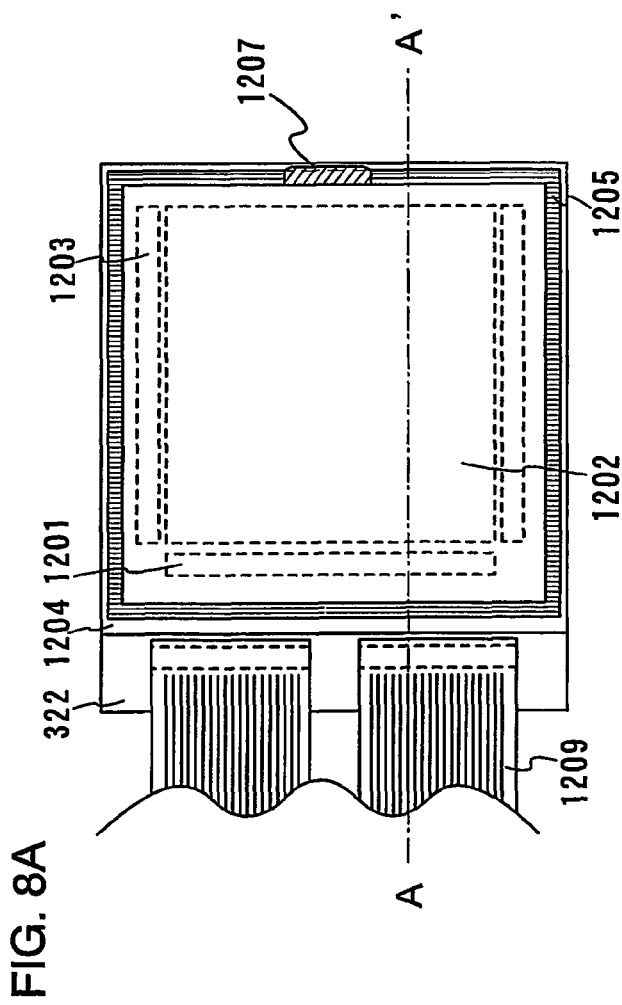
FIGS. 8A and 8B are top view and cross sectional view explaining a liquid crystal display device having a color filter according to the invention.
Figure 8B:
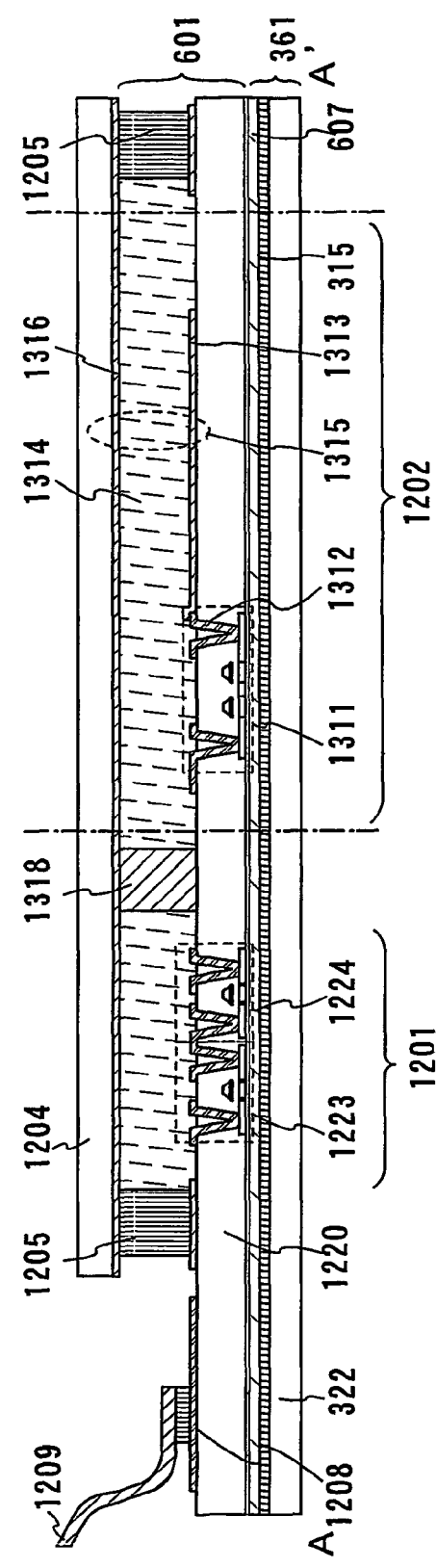

In the present embodiment, an exterior appearance of a panel corresponding to one embodiment of a display device of the invention will be explained with reference to FIGS. 8A and 8B. FIG. 8A shows a top view of a panel in which a layer 601 with elements formed therein (concretely, a TFT and a liquid crystal layer) is encapsulated between a substrate 361 having a color filter and a second substrate 1204 by using a sealing material 1205. FIG. 8B corresponds to a cross sectional view taken along a line A-A' of FIG. 8A.

In FIG. 8A, reference numeral 1201 denoted by a doted line is a signal line driver circuit; 1202, a pixel portion; and 1203, a scanning line driver circuit. Further, reference numeral 322 denotes a first substrate and reference numeral 1204 denotes a second substrate, and reference numerals 1205 and 1207 denote a first sealing material and a second sealing material, respectively, that contain a gap material for maintaining a gap of an enclosed space. A layer in which semiconductor elements, typically, TFTs 1223, 1224, and 1311 are formed, is attached to the first substrate by using an adhesive material 607. The first substrate 322 and the second substrate 1204, that is, the layer with the elements formed therein and the second substrate are sealed with a sealing material 1205, and a liquid crystal is filled therebetween.

Next, a cross sectional structure will be described referring to FIG. 8B. A driver circuit and a pixel portion are formed over the first substrate 322, which includes a plurality of semiconductor elements represented by the TFTs. As the substrate 361 having the color filter, a color filter is provided on the first substrate 322. The signal line driver circuit 1201 as a driver circuit and the pixel portion 1202 are shown here. A CMOS circuit composed by combining an n-channel TFT 1223 and a p-channel TFT 1224 is formed as the signal line driver circuit 1201.

The first electrode 1313 of a liquid crystal element 1315 is electrically connected to the TFT 1311 via a wiring 1312. A second electrode 1316 of the liquid crystal element 1315 is formed on the second substrate 1204. A portion overlapped with the first electrode 1313, the second electrode 1316, and the liquid crystal 1314 corresponds to the light crystal element 1315.

Reference numeral 1318 denotes a spherical spacer, which is provided for controlling a distance (cell gap) between the first electrode 1313 and the second electrode 1316. A spacer that is formed by etching an insulating film into a predetermined shape may be used instead. Various kinds of signals and voltage supplied to the scanning line driver circuit 1203 or the pixel portion 1202 are supplied from an FPC 1209 via a connection wiring 1208.

In the present embodiment, the substrate 361 having the color filter is attached to the layer 601 with the elements formed therein by using an adhesive material 607 as illustrated in FIG. 6A of Embodiment 3. Note that, the color filter may be used as the second substrate, whereas the plastic substrate may be used as the first substrate in the same manner as FIG. 6B of Embodiment 3.

Although the scanning line driver circuit formed by using the TFTs is shown here, the prevent embodiment is not limited to the structure. Alternatively, a scanning line driver circuit and a signal line driver circuit may be formed of transistors using a single-crystal semiconductor, and attached.

One feature of the liquid crystal display device described in this embodiment is that the layer with the elements formed therein and the color filter are formed individually in the separating steps, and then both are attached to each other after being completed. By taking such a structure, the yield of the layer with the elements, i.e., the TFT and the light emitting element, formed therein and the yield of the color filter can be individually controlled, thereby suppressing decline in the yield of the entire liquid crystal display device.

Furthermore, the steps of manufacturing an active matrix substrate and the steps of manufacturing a color filter can be simultaneously run, thereby reducing manufacturing lead time for the liquid crystal display device.

By utilizing a plastic substrate, a liquid crystal display device having reduced weight with an improved impact resistance property can be manufactured.

Embodiment 6

Various kinds of electronic appliances can be manufactured by incorporating display devices obtained according to the invention. Examples of the electronic appliances include: a TV set; a video camera; a digital camera; a goggle type display (a head-mounted display); a navigation system; an audio reproduction device (such as a car audio and an audio component system); a personal laptop computer; a game machine; a portable information terminal (such as a mobile computer, a cellular telephone, a portable game machine, and an electronic book); an image reproduction device provided with a recording medium (typically, a device which can reproduce the recording medium such as a DVD (digital versatile disc) and display images thereof); and the like. As representative examples of these electronic appliances, a television, a personal laptop computer, and an image reproduction device provided with a recording medium will be illustrated in FIGS. 10A to 10C.

Figure 10A:
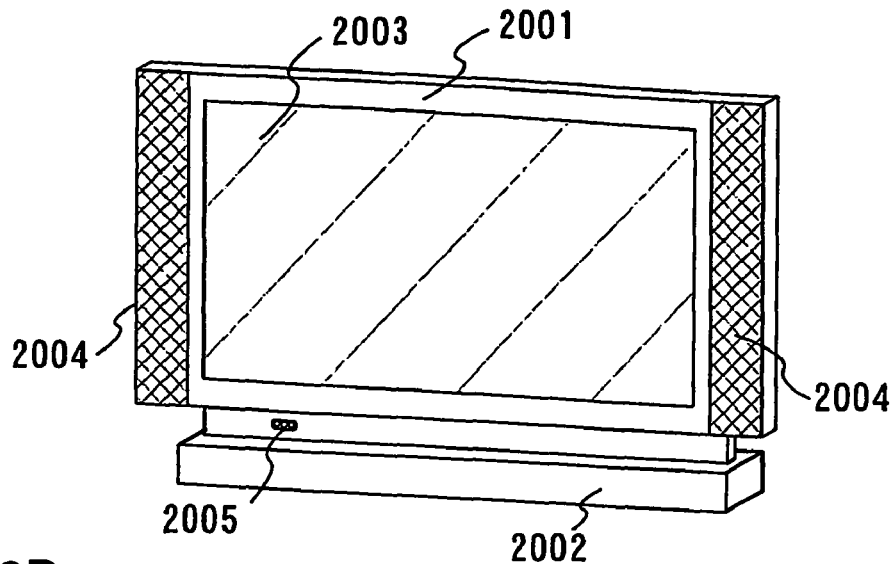
FIGS. 10A to 10C are diagrams explaining examples of electronic appliances.

FIG. 10A is a television including a casing 2001; a supporting base 2002; a display portion 2003; a speaker portion 2004; a video input terminal 2005; and the like. The present invention can be applied to the display portion 2003. The television includes every television for displaying information such as one for a personal computer, for receiving TV broadcasting, and for advertisement. By implementing the present invention, a television having a thin and lightweight display portion can be manufactured.

Figure 10B:
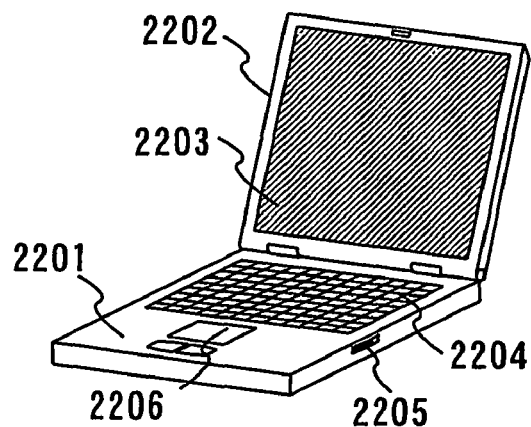

FIG. 10B is a personal laptop computer including a main body 2201; a casing 2202; a display portion 2203; a keyboard 2204; an external connection port 2205; a pointing mouse 2206; and the like. The present invention can be applied to the display portion 2203. By implementing the present invention, a thin and lightweight personal laptop computer can be manufactured.

Figure 10C:
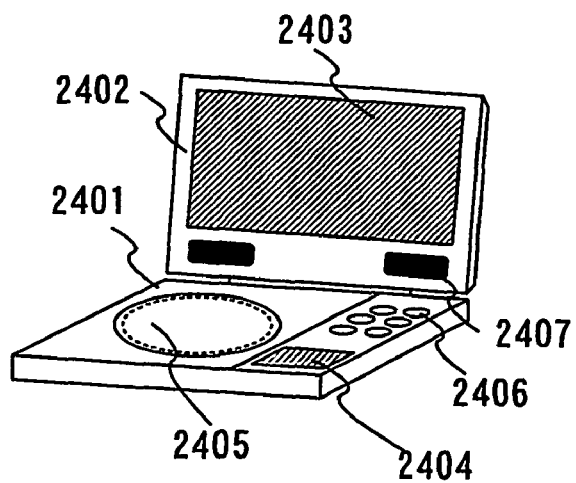

FIG. 10C is a portable image reproduction device provided with a recording medium (specifically, a DVD player), including a main body 2401; a casing 2402; a display portion A 2403; a display portion B 2404; a recording medium (such as a DVD) reading portion A 2405; operation keys 2406; a speaker portion 2407; and the like. The display portion A 2403 mainly displays image information whereas the display portion B 2404 mainly displays character information. The present invention can be applied to both the display portion A 2403 and the display portion B 2404. Note that the image reproduction device provided with the recording medium includes a domestic game machine and the like. By implementing the present invention, a thin and lightweight portable image reproduction device equipped with the recording medium can be manufactured.

The invention claimed is:

1. A method of manufacturing an optical film comprising:
forming a metal layer on a first substrate;
subjecting the metal layer to at least one of a thermal oxidization treatment, an oxygen plasma treatment, and a treatment with oxidizing solution to form a metal oxide layer on the metal layer;
forming an insulating layer on the metal oxide layer;
forming a subject body having an optical filter on the insulating layer;
attaching a second substrate to the subject body by using a first adhesive material so that the second substrate faces the first substrate;
attaching a support medium to the second substrate by using a peelable adhesive agent;
separating the first substrate from the subject body in a region between the metal layer and the insulating layer; and
separating the support medium and the peelable adhesive agent from the second substrate,
wherein the first substrate is a glass substrate.

2. A method of manufacturing an optical film according to claim 1, wherein the metal layer is formed of an element selected from titanium, aluminum, tantalum, tungsten, molybdenum, copper, chromium, neodymium, iron, nickel, cobalt, ruthenium, rhodium, palladium, osmium, iridium; or a single layer made from an alloy material or a compound material having the elements as its main constituent; or a lamination layer thereof.

3. A method of manufacturing an optical film according to claim 1, wherein the optical filter is a color filter or a color conversion filter.

4. A method of manufacturing an optical film according to claim 3, wherein the color filter is formed by an etching method using a photosensitive resin.

5. A method of manufacturing an optical film according to claim 1, wherein the second substrate is plastic.

6. A method of manufacturing an optical film according to claim 1, wherein the optical film comprises a plurality of optical functions.

7. A method of manufacturing an optical film according to claim 6, wherein the second substrate is a polarizing plate, an elliptical polarizing plate composed of a retardation plate and a polarizing plate, a reflection film, or a light diffusing plate.

8. A method of manufacturing an optical film comprising:
forming a metal layer on a first substrate;
subjecting the metal layer to at least one of a thermal oxidization treatment, an oxygen plasma treatment, and a treatment with oxidizing solution to form a metal oxide layer on the metal layer;
forming an insulating layer on the metal oxide layer;
forming a subject body having an optical filter on the insulating layer, the optical filter comprising a black matrix and a colored layer;
attaching a support medium to the subject body by using a peelable adhesive agent so that the support medium faces the first substrate;
separating the first substrate from the subject body in a region between the metal layer and the insulating layer;
forming a second substrate on the subject body using an adhesive material; and
separating the support medium and the peelable adhesive agent from the subject body,
wherein the first substrate is a glass substrate.

9. A method of manufacturing an optical film according to claim 8, wherein the metal layer is formed of an element selected from titanium, aluminum, tantalum, tungsten, molybdenum, copper, chromium, neodymium, iron, nickel, cobalt, ruthenium, rhodium, palladium, osmium, iridium; or a single layer made from an alloy material or a compound material having the elements as its main constituent; or a lamination layer thereof.

10. A method of manufacturing an optical film according to claim 8, wherein the support medium is a glass substrate, a quartz substrate, a metal substrate, or a ceramic substrate.

11. A method of manufacturing an optical film according to claim 8, wherein the peelable adhesive agent is a reactive peeling adhesive, a thermal peeling adhesive, a light peeling adhesive, or an anaerobic peeling adhesive; or a material having adhesive layers formed of one or more of these on both sides thereof.

12. A method of manufacturing an optical film comprising:
forming a metal layer on a first substrate;
subjecting the metal layer to at least one of a thermal oxidization treatment, an oxygen plasma treatment, and a treatment with oxidizing solution to form a metal oxide layer on the metal layer;
forming an insulating layer on the metal oxide layer;
forming an optical filter on the insulating layer;
attaching a second substrate to the optical filter by using a first adhesive material;
attaching a support medium to the second substrate by using a peelable adhesive agent;
separating the first substrate from the optical filter in a region between the metal layer and the insulating layer; and
separating the support medium and the peelable adhesive agent from the second substrate,
wherein the first substrate is a glass substrate.

13. A method of manufacturing an optical film according to claim 12, wherein separation between the metal layer and the insulating layer is caused by a physical means.

14. A method of manufacturing an optical film according to claim 12, wherein the insulating layer is formed after forming the metal oxide layer by oxidizing a surface of the metal layer.

15. A method of manufacturing an optical film according to claim 12, wherein the metal layer is formed of an element selected from titanium, aluminum, tantalum, tungsten, molybdenum, copper, chromium, neodymium, iron, nickel, cobalt, ruthenium, rhodium, palladium, osmium, iridium; or a single layer made from an alloy material or a compound material having the elements as its main constituent; or a lamination layer thereof.

16. A method of manufacturing an optical film according to claim 12, wherein the insulating layer comprises silicon oxide, silicon oxynitride, or metal oxide.

17. A method of manufacturing an optical film comprising:
forming a metal layer on a first substrate;
subjecting the metal layer to at least one of a thermal oxidization treatment, an oxygen plasma treatment, and a treatment with oxidizing solution to form a metal oxide layer on the metal layer;
forming an insulating layer on the metal oxide layer;
forming an optical filter on the insulating layer, the optical filter comprising a black matrix and a colored layer;
forming a peelable adhesive agent on the optical filter;
forming a support medium on the optical filter;
separating the first substrate from the optical filter in a region between the metal layer and the insulating layer;
forming a second substrate on the insulating layer by using an adhesive material; and
separating the support medium and the peelable adhesive agent from the optical filter,
wherein the first substrate is a glass substrate.

18. A method of manufacturing an optical film comprising:
forming a metal layer on a first substrate;
subjecting the metal layer to at least one of a thermal oxidization treatment, an oxygen plasma treatment, and a treatment with oxidizing solution to form a metal oxide layer on the metal layer;
forming an insulating layer on the metal oxide layer;
forming an optical filter on the insulating layer, the optical filter comprising a black matrix and a colored layer;
forming a peelable adhesive agent on the optical filter;
forming a support medium on the optical filter;
separating the first substrate from the optical filter in a region between the metal layer and the insulating layer;
forming a second substrate over the insulating layer by using an adhesive material; and
separating the support medium and the peelable adhesive agent from the optical filter,
wherein the first substrate is a glass substrate.

* * * * *